(12) United States Patent
Burbidge

(10) Patent No.: US 8,103,322 B2
(45) Date of Patent: Jan. 24, 2012

(54) HANDHELD ELECTRONIC DEVICE HAVING TWO DEVICE MEMBERS SLIDABLE RELATIVE TO A BRIDGE

(75) Inventor: Ryan Burbidge, Claremont (CA)

(73) Assignee: Research In Motion Limited, Waterloo (CA)

( * ) Notice: Subject to any disclaimer, the term of this patent is extended or adjusted under 35 U.S.C. 154(b) by 463 days.

(21) Appl. No.: 12/394,960

(22) Filed: Feb. 27, 2009

(65) Prior Publication Data

US 2010/0222116 A1    Sep. 2, 2010

(51) Int. Cl.
*H04M 1/00* (2006.01)
*G06F 1/16* (2006.01)

(52) U.S. Cl. ............. 455/575.4; 455/556.1; 361/679.06; 361/679.09

(58) Field of Classification Search .............. 455/90.3, 455/575.4, 575.1, 556.1, 556.2; 361/679.01, 361/679.02, 679.04, 679.06, 679.08, 679.09
See application file for complete search history.

(56) References Cited

U.S. PATENT DOCUMENTS

| | | | |
|---|---|---|---|
| 4,961,126 A | 10/1990 | Suzuki | |
| 5,198,991 A | 3/1993 | Pollitt | |
| 5,202,817 A | 4/1993 | Koenck et al. | |
| 5,255,214 A | 10/1993 | Ma | |
| D524,809 S | 7/2006 | Alcouloumre et al. | |
| 7,107,018 B2 * | 9/2006 | Jellicoe | 455/90.3 |
| 7,170,740 B1 | 1/2007 | Liu et al. | |
| 7,281,698 B2 | 10/2007 | Patterson | |
| 7,353,053 B2 * | 4/2008 | Prichard et al. | 455/575.4 |
| 7,385,150 B1 | 6/2008 | Siddiqui et al. | |
| D580,930 S | 11/2008 | Chien et al. | |
| 7,493,151 B2 * | 2/2009 | Collins | 455/575.4 |
| 7,526,325 B2 * | 4/2009 | Park et al. | 455/575.3 |
| 7,610,069 B2 * | 10/2009 | Kwak et al. | 455/575.4 |
| 7,920,372 B2 * | 4/2011 | Tompkin | 361/679.01 |
| 7,986,981 B2 * | 7/2011 | Jin et al. | 455/575.1 |
| 2003/0006968 A1 | 1/2003 | Solomon | |
| 2003/0025668 A1 | 2/2003 | Lin | |
| 2003/0032395 A1 | 2/2003 | Huang et al. | |
| 2003/0078069 A1 | 4/2003 | Lindeman | |
| 2003/0132863 A1 | 7/2003 | Lahr | |

(Continued)

FOREIGN PATENT DOCUMENTS

CA    2580954    3/2006

(Continued)

OTHER PUBLICATIONS

Radoglou, Athanassia, Extended European Search Report for EP09154054.2, Jun. 23, 2009.
Lam, Dominic, First Office Action for CA 2,689,954, Aug. 11, 2011.

*Primary Examiner* — Don Le
(74) *Attorney, Agent, or Firm* — Integral Intellectual Property Inc.; Miriam Paton

(57) ABSTRACT

In a particular embodiment there is provided a handheld electronic device, comprising a bridge, a first device member having a first i/o element thereon and a second device member having a second i/o element thereon. The first and second device members are slidable relative to the bridge between a closed position for the handheld electronic device and a spaced-apart position for the handheld electronic device. In the closed position the first and second device members overlap such that the first device member blocks access to the second i/o element. In the spaced-apart position the second i/o element is accessible and the first and second device members are spaced apart by a selected non-zero spacing.

20 Claims, 20 Drawing Sheets

| U.S. PATENT DOCUMENTS | | | FOREIGN PATENT DOCUMENTS | | |
|---|---|---|---|---|---|
| 2004/0066373 A1 | 4/2004 | Wu | CA | 2613501 | 6/2008 |
| 2004/0206876 A1 | 10/2004 | Kato | EP | 1051012 | 11/2000 |
| 2004/0233620 A1 | 11/2004 | Doczy et al. | EP | 1944949 | 7/2008 |
| 2005/0050687 A1 | 3/2005 | Shiba | WO | WO-9704380 | 2/1997 |
| 2005/0055806 A1 | 3/2005 | Shiba | WO | WO-0028510 | 5/2000 |
| 2005/0134568 A1 | 6/2005 | Hill et al. | WO | WO-0038332 | 6/2000 |
| 2005/0213744 A1 | 9/2005 | Valli | WO | WO-0116677 | 3/2001 |
| 2005/0278896 A1 | 12/2005 | Nishihara | WO | WO-03014897 | 2/2003 |
| 2006/0075934 A1 | 4/2006 | Ram | WO | WO-03021408 | 3/2003 |
| 2007/0008291 A1 | 1/2007 | Liu | WO | WO-03023585 | 3/2003 |
| 2007/0041773 A1 | 2/2007 | Pirila et al. | WO | WO-03050665 | 6/2003 |
| 2007/0217138 A1 | 9/2007 | Langgood et al. | WO | WO-2005067479 | 7/2005 |
| 2007/0290890 A1 | 12/2007 | Chen et al. | WO | WO-2005109838 | 11/2005 |
| 2008/0039155 A1 | 2/2008 | Kim | WO | WO-2006034309 | 3/2006 |
| 2008/0117571 A1 | 5/2008 | Song | WO | WO-2006108909 | 10/2006 |
| 2008/0117572 A1 | 5/2008 | Maatta | | | |
| 2008/0198136 A1 | 8/2008 | Cheng et al. | | | |

* cited by examiner

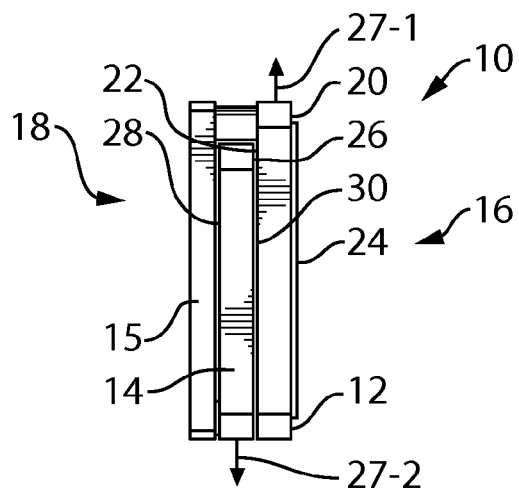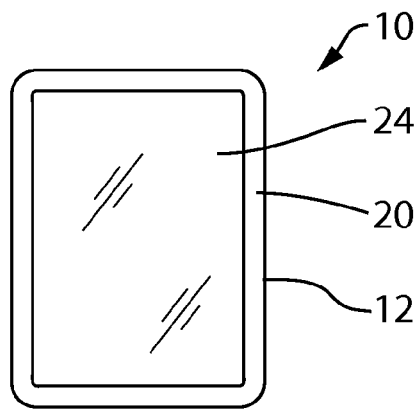
FIG. 2-1  FIG. 2-2
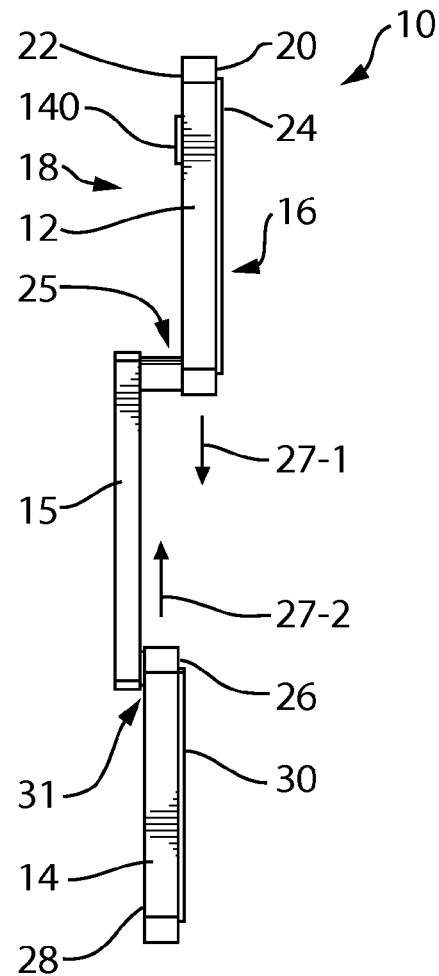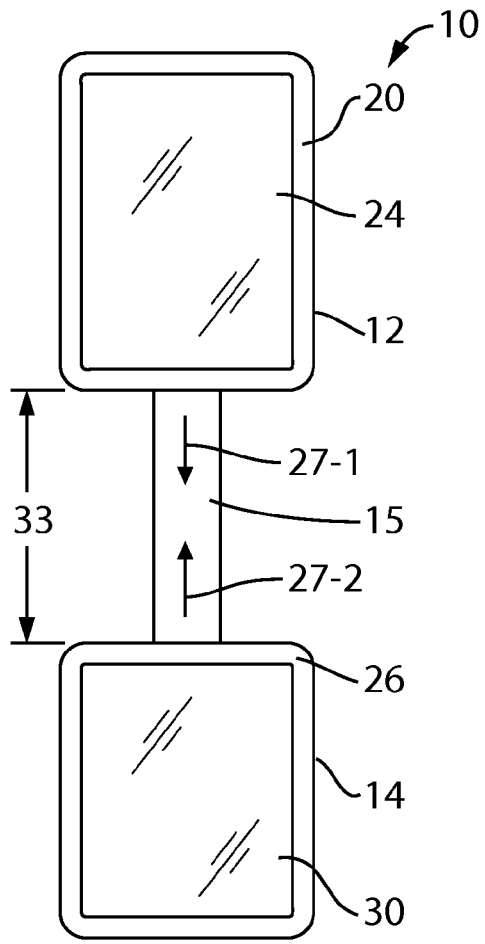
FIG. 3-1  FIG. 3-2

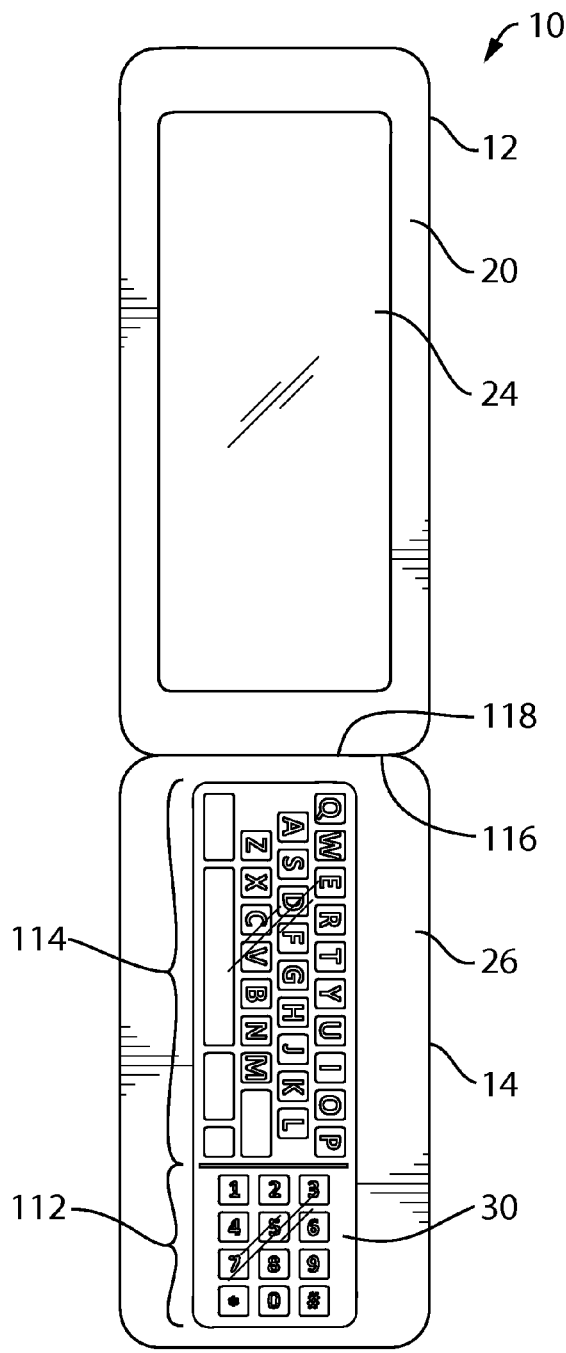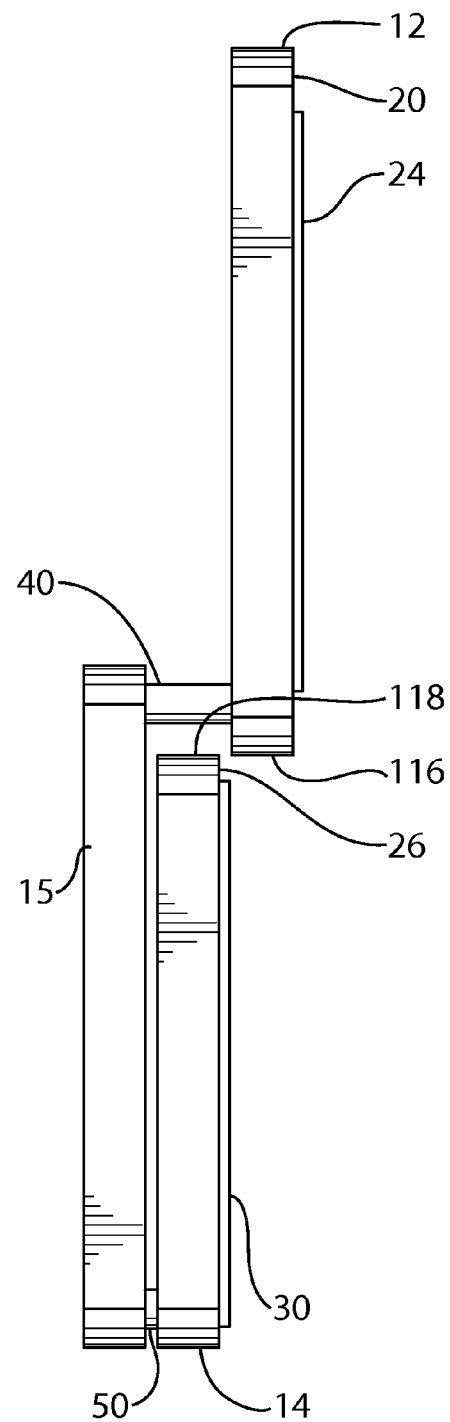
FIG. 11-1    FIG. 11-2

HANDHELD ELECTRONIC DEVICE HAVING TWO DEVICE MEMBERS SLIDABLE RELATIVE TO A BRIDGE

FIELD OF THE TECHNOLOGY

The present technology relates to handheld electronic devices and more particularly to a handheld electronic device that is configured to be compact.

BACKGROUND

Handheld electronic devices, such as smartphones, cellular telephones and personal digital assistant (PDAs) can provide useful functionality in a small package. However, conflicting considerations exist in certain aspects of their design in some instances. For example, compactness of the device is beneficial for portability. However, by making a device compact, a user may find it difficult or uncomfortable to use the device, as the i/o elements contained on the device may be close together as a consequence of the device's compact design.

BRIEF DESCRIPTION OF THE DRAWINGS

The present technology will now be described by way of example only with reference to the attached drawings, in which:

FIG. 2-1 is an elevation view of a side edge of the handheld electronic device shown in FIG. 1, in the closed position;

FIG. 2-2 is an elevation view of a side of the handheld electronic device shown in FIG. 1, in the closed position;

FIG. 3-1 is an elevation of a side edge view of the handheld electronic device shown in FIG. 1, in a spaced-apart position;

FIG. 3-2 is an elevation view of a side of the handheld electronic device shown in FIG. 1, in the spaced-apart position;

FIG. 11-1 is an elevation view of a side of the handheld electronic device shown in FIG. 1, in a second intermediate position;

FIG. 11-2 is an elevation view of a side edge of the handheld electronic device shown in FIG. 1, in the second intermediate position;

FIGS. 13-1, 13-2 and 13-3 are elevation views of a side of the handheld electronic device shown in FIG. 1 with the optional structure shown in FIG. 12, showing different orientations of a first device member of the handheld electronic device;

FIGS. 14-1, 14-2 and 14-3 are elevation views of a side of the handheld electronic device shown in FIG. 1 with the optional structure shown in FIG. 12, showing different orientations of a second device member of the handheld electronic device;

FIGS. 15-1 and 15-2 are elevation views of a side of the handheld electronic device shown in FIG. 1 with the optional structure shown in FIG. 12, showing different orientations of both the first and second device members;

FIG. 15-3 is an elevation view of the handheld electronic device shown in FIG. 1 with a variant of the optional structure shown in FIG. 12; and FIGS. 16-1 and 16-2 are elevation views of a side and a side edge respectively of a variant of the handheld electronic device shown in FIG. 1.

DETAILED DESCRIPTION

In a first aspect, the technology is directed to a handheld electronic device, such as a smartphone, a cellular telephone or a personal digital assistant (PDA), that has a first device member and a second device member that are connected by a bridge and that are slidable between a closed position and a spaced apart position. In the closed position, the first device member, the second device member and the bridge overlap by selected amounts to make the device compact. In the spaced apart position the first and second device members are spaced apart by a selected amount permitting a user to use them relatively comfortably, by permitting the user to set his/her sightline at a point (e.g. a display on the first device member) that is spaced from where the user enters information (e.g. a keypad on the second device member).

In a particular embodiment there is provided a handheld electronic device, comprising a bridge, a first device member having a first i/o element thereon and a second device member having a second i/o element thereon. The first device member is slidably connected to the bridge for movement along a first device member path. The second device member is slidably connected to the bridge for movement along a second device member path. The first and second device members are slidable relative to the bridge between a closed position for the handheld electronic device and a spaced-apart position for the handheld electronic device. In the closed position the first and second device members overlap such that the first device member blocks access to the second i/o element. In the spaced-apart position the second i/o element is entirely accessible and the first and second device members are spaced apart by a selected non-zero spacing in a direction that is generally parallel to the first and second device member paths.

Figure 1:
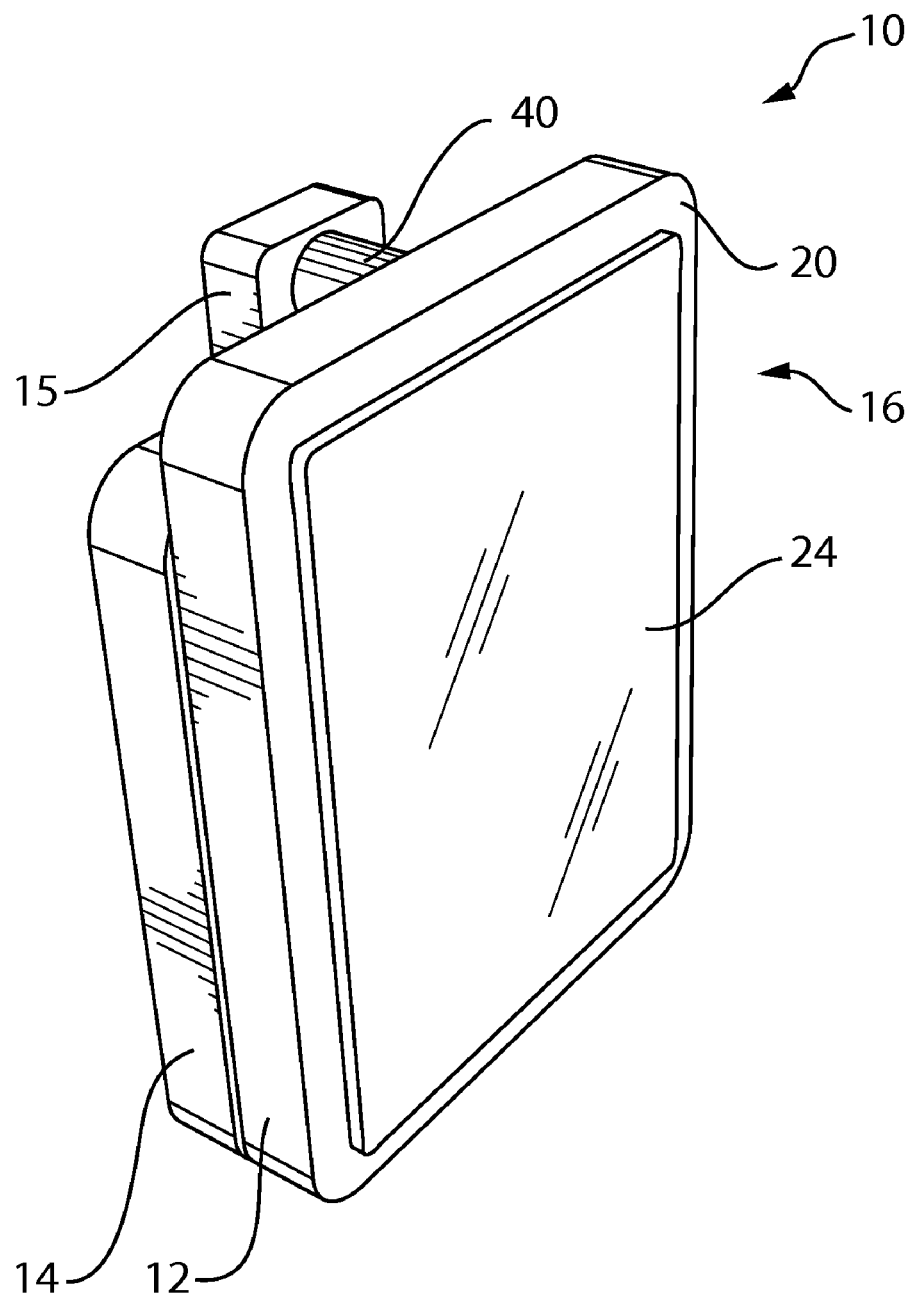
FIG. 1 is a perspective view showing a handheld electronic device in a closed position, in accordance with an embodiment of the present technology.

Reference is made to FIG. 1, which shows a handheld electronic device 10 in accordance with an embodiment of the present technology. The handheld electronic device 10 may be any type of device, such as a smartphone, a cellular telephone or a personal digital assistant (PDA).

Figures 1, 13:
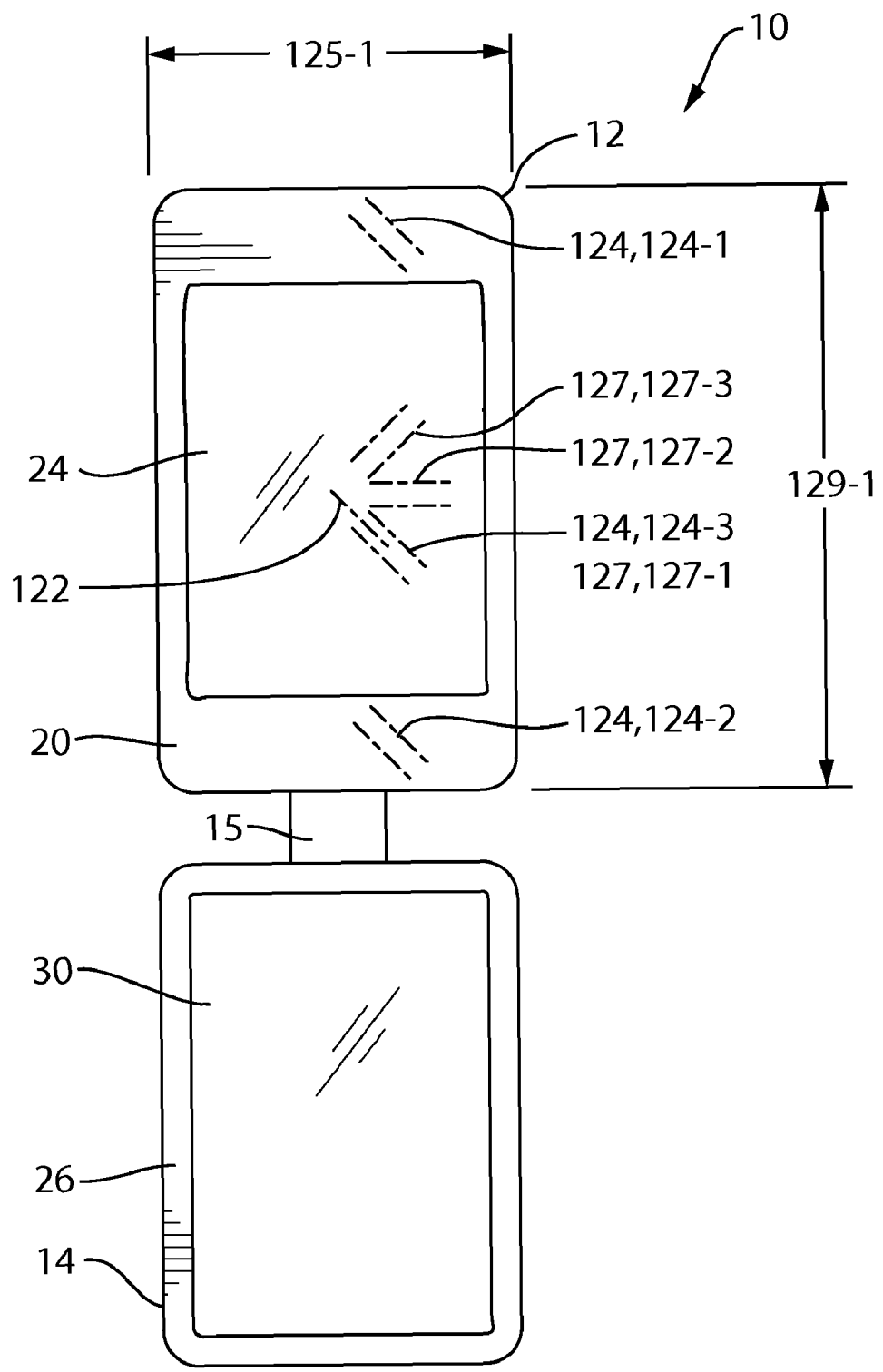
Figures 2, 13:
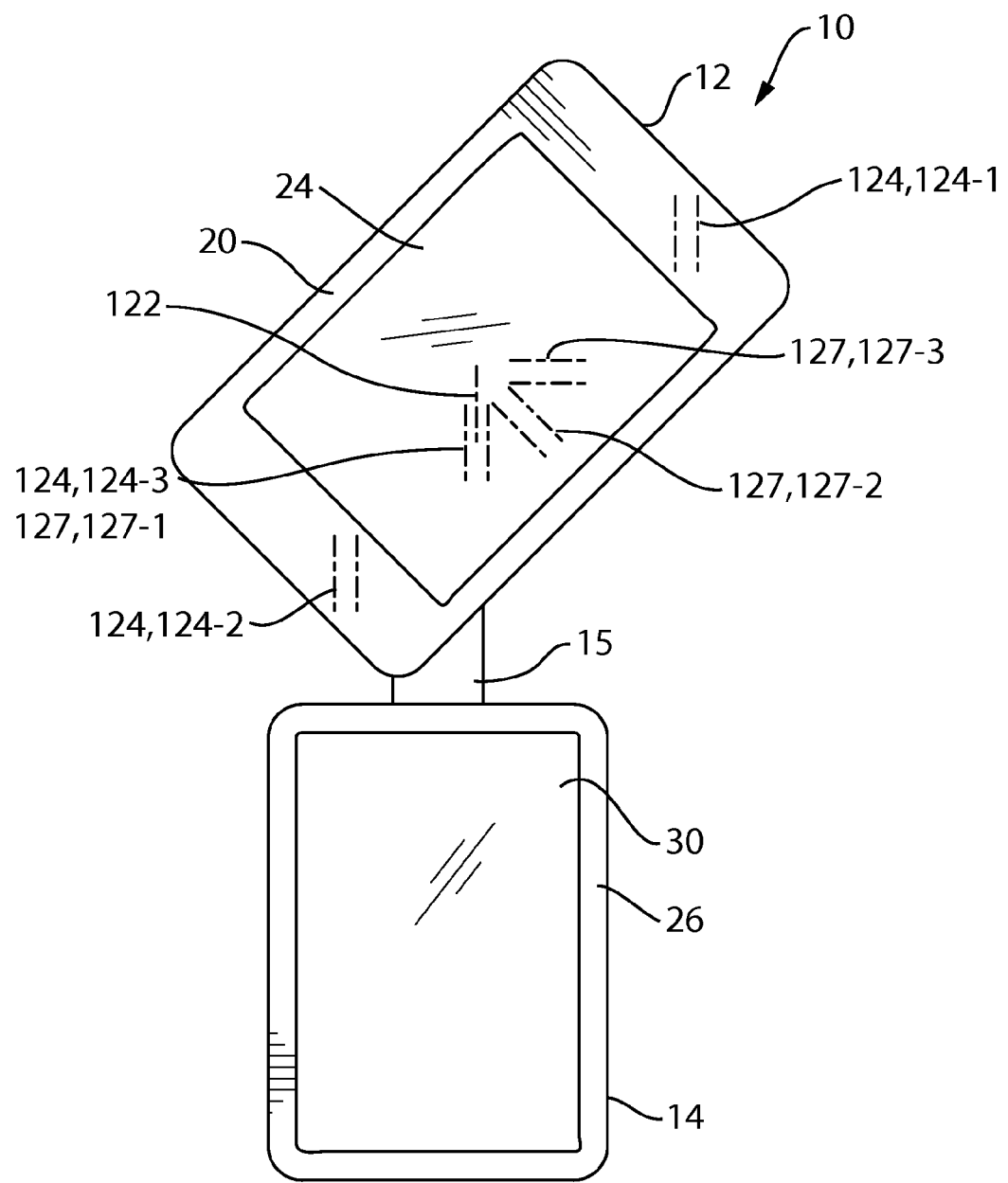
Figures 3, 13:
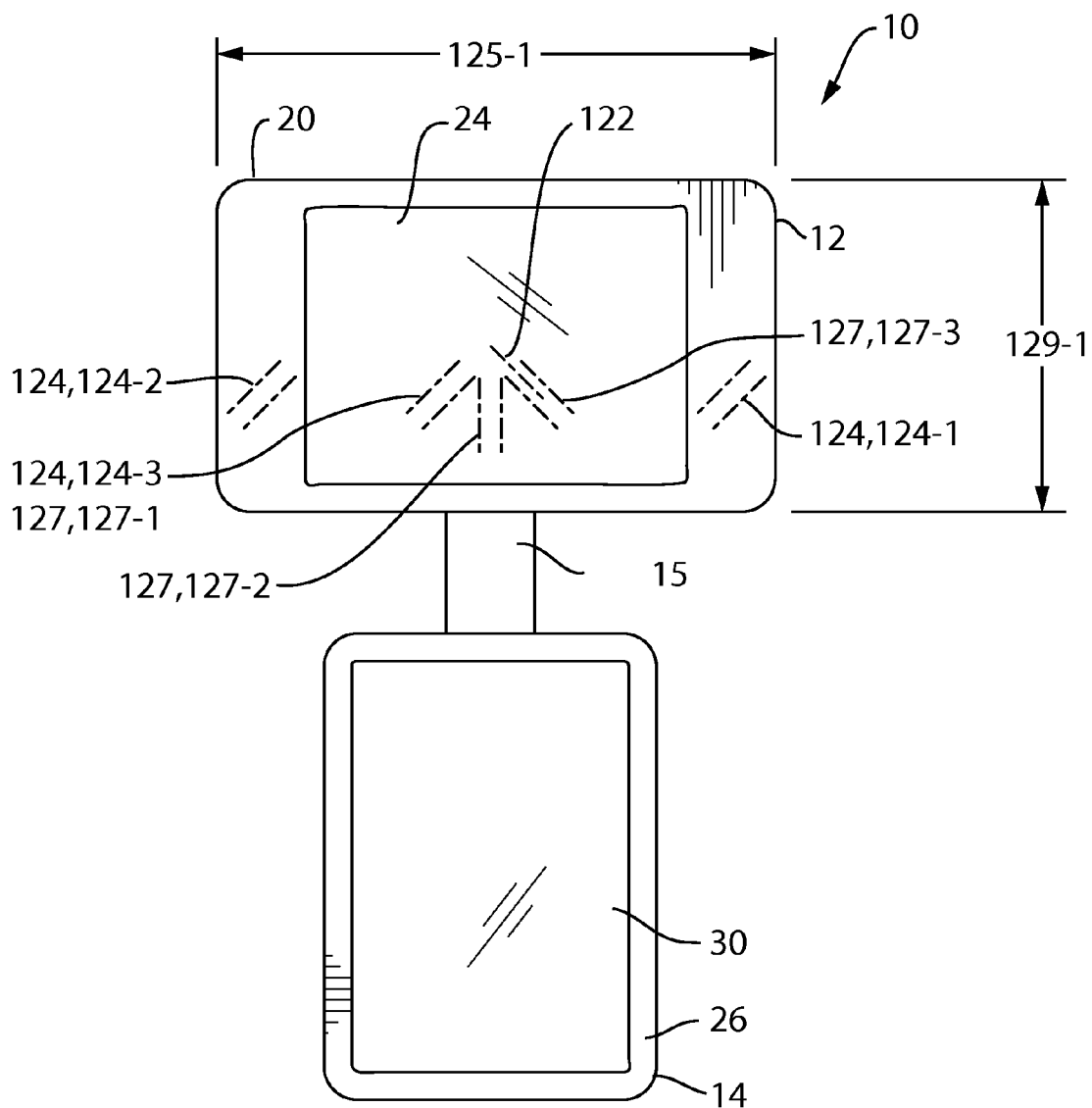

The handheld electronic device 10 includes a first device member 12, a second device member 14 and a bridge 15. As shown in FIGS. 3-1 and 3-2, the first and second device members 12 and 14 may, for example, be upper and lower device members respectively. Referring to FIG. 2-1, the first and second device members 12 and 14 together define a first side 16 and a second side 18 of the handheld electronic device 10. The handheld electronic device 10 is shown in a closed position in FIGS. 2-1 and 2-2 and is shown in a spaced-apart position in FIGS. 3-1 and 3-2.

Referring to FIGS. 2-1 and 3-1, a first face of the first device member 12 is shown at 20 and faces the first side 16 of the handheld electronic device 10. A second face of the first device member 12 is shown at 22 and faces the second side 18 of the handheld electronic device 10. A first i/o element 24 may be positioned on the first face 20 of the first device member 12. An i/o element is any element that can be used to input information into the handheld electronic device 10, output information from the handheld electronic device 10, or both. Examples of i/o elements that can be used to input information into the handheld electronic device 10, (i.e. input elements), include a keypad, such as a numeric, alphabetic or alphanumeric keypad, a thumbwheel, a trackpad, a trackball, a microphone and a camera. It will be noted that, for the purposes of this disclosure and the accompanying claims, an alphanumeric keypad is to be considered a type of alphabetic keypad. In other words, it is an alphabetic keypad that also contains numeric keys. It will also be noted that an alphabetic keypad may have an individual key for each letter of the alphabet, however it is not necessary for it to. Some or all of the keys may contain more than one letter, an example of which is provided on the Blackberry® Pearl™ smartphone sold by Research in Motion Limited of Waterloo, Ontario, Canada. Examples of i/o elements that can be used to output information from the handheld electronic device 10 (i.e. output elements) include a display and a speaker. An example of an i/o element that acts as both an input element and as an output element is a touch-screen. The first i/o element 24 may be any suitable type of i/o element, such as, for example, a display.

The first device member 12 is slidably connected to the bridge 15 by a first slide connection 25 (FIG. 3-1), and is movable along a first device member path 27-1 between a first position (FIG. 2-1) and a second position (FIG. 3-1). The first i/o element 24 may be exposed regardless of whether the first device member 12 is in the first position (FIG. 2-1) or the second position (FIG. 3-1).

A first face of the second device member 14 is shown at 26 and faces the first side 16 of the handheld electronic device 10. A second face of the first device member 12 is shown at 28 and faces the second side 18 of the handheld electronic device 10. A second i/o element 30 may be positioned on the first face 26 of the first device member 12. The second i/o element 30 may be any suitable type of i/o element, such as, for example, an input element. More specifically, the second i/o element 30 may be, for example, an combination alphabetic and telephone keypad, or a touch screen.

The second device member 14 is slidably connected to the bridge 15 by a second slide connection 31 (FIG. 5), and is movable along a second device member path 27-2 between a first position (FIG. 2-1) and a second position (FIG. 3-1).

When the handheld electronic device 10 is in a closed position (FIGS. 2-1 and 2-2) which corresponds to each of the first and second device members 12 and 14 being in their respective first positions, the first device member 12 covers the second i/o element 30, thereby blocking access to the second i/o element 30. It is optionally possible that there may be other i/o elements (e.g. buttons) on the first face 26 of the second device member 14 that are not blocked by the first device member 12 when the handheld electronic device 10 is in the closed position.

Figure 4:
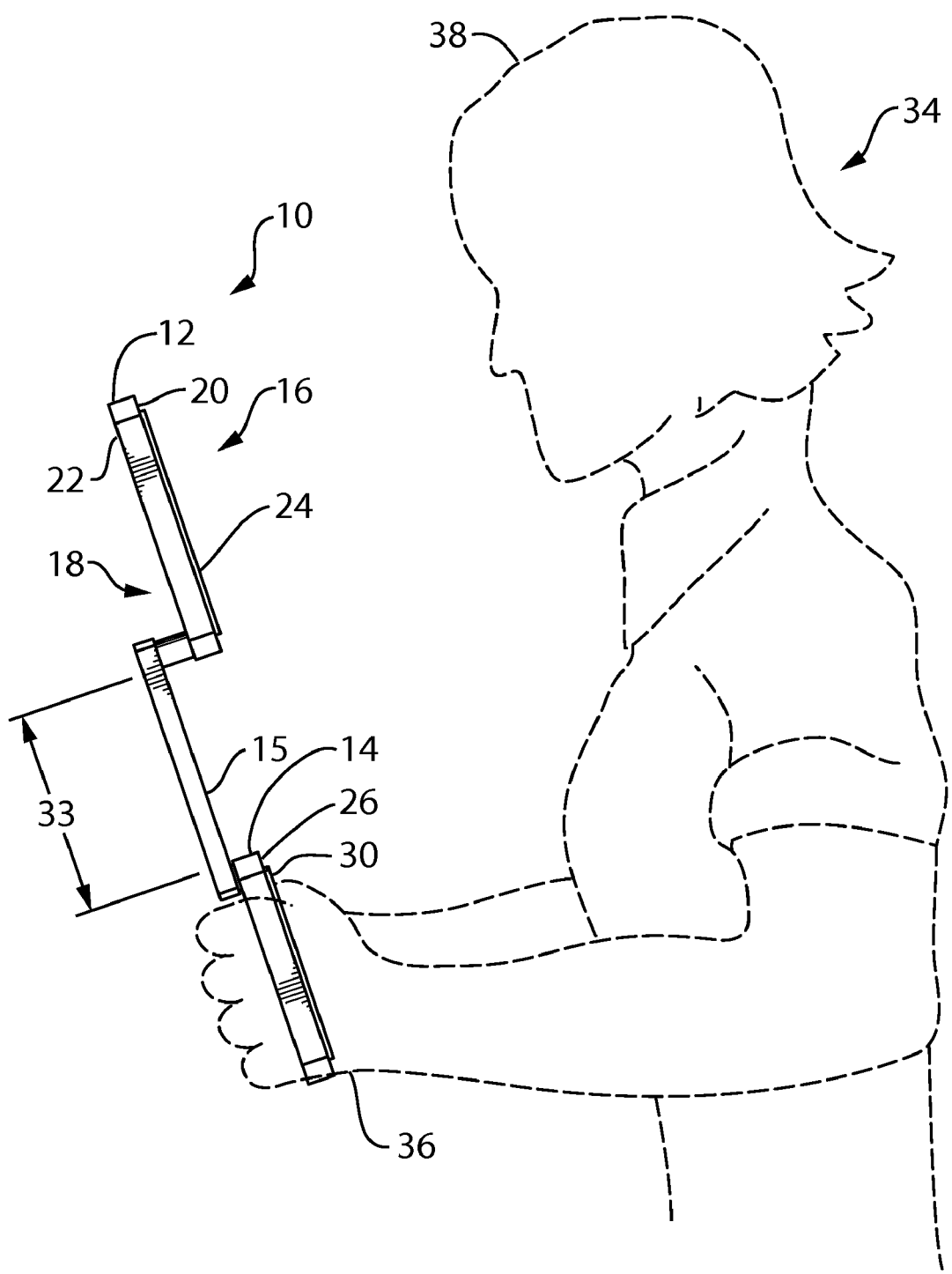
FIG. 4 is an elevation view of the handheld electronic device shown in FIG. 1 in use in the spaced-apart position.

When the first and second device members 12 and 14 are positioned such that the handheld electronic device 10 is in the spaced-apart position (FIGS. 3-1 and 3-2), the entirety of the second i/o element 30 is exposed and is thus accessible by a user. Furthermore, the first and second i/o elements 24 and 30 are spaced apart from each other by a selected non-zero spacing 33 (FIG. 3-2), which is a spacing in a direction that is generally parallel to the first and second device member paths 27-1 and 27-2, which may facilitate use by a user. More specifically, with reference to FIG. 4, a user, shown at 34, may want to look at the first i/o element 24 while inputting information using the second i/o element 30. For example, in an embodiment wherein the first i/o element 24 is a display and the second i/o element 30 is a keypad, the user would look at the display while entering information using the keypad. Providing the non-zero spacing 33 between the first and second device members 12 and 14 permits a user 34 to position the second i/o element 30 at a suitable position for entering information with his/her hands 36, while the position of the first i/o element 24 permits the head 38 of the user 34 to have a relatively more upright orientation when viewing the first i/o element 24, as compared to some devices that have first and second i/o elements that are immediately next to one another. This relatively more upright orientation of the head 38 may have the effect of reducing neck strain.

Figure 5:
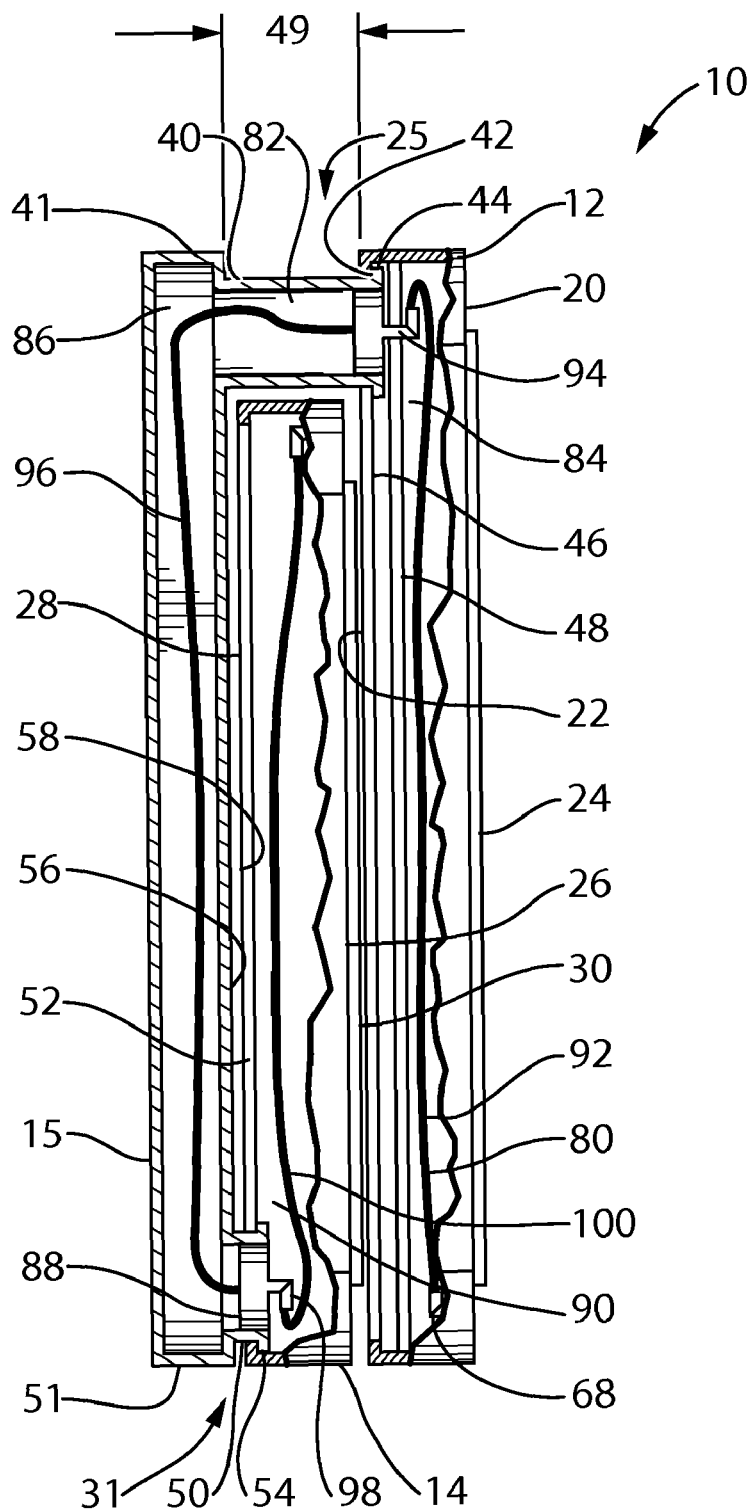
FIG. 5 is a magnified cutaway elevation view of a side edge of the handheld electronic device shown in FIG. 1, in the closed position.

Reference is made to FIG. 5, which shows the handheld electronic device 10 in the closed position, with selected portions cut away to show the first slide connection 25 between the first device member 12 and the bridge 15 and the second slide connection 31 between the second device member 14 and the bridge 15. The first slide connection 25 may be made up of a first mushroom pin 40 at a first end 41 of the bridge 15 and a first device member slot 42 (shown more clearly in FIG. 7) on the second face 22 of the first device member 12. For the purposes of this disclosure and the appended claims, a mushroom pin may be any kind of pin having a flange (i.e. a head) that is wider than its body. It need not actually be mushroom-shaped. In other words, it need not have a rounded head. Referring to FIG. 5, the first mushroom pin 40 has a flange 44 that is captured between a first wall 46 and a second wall 48. As a result, the first device member 12 is configured to ride on the first mushroom pin 40 at a selected first device member spacing 49 from the bridge 15. The spacing 49 is sized to permit the second device member 14 to slide between the first device member 12 and the bridge 15.

Figure 6:
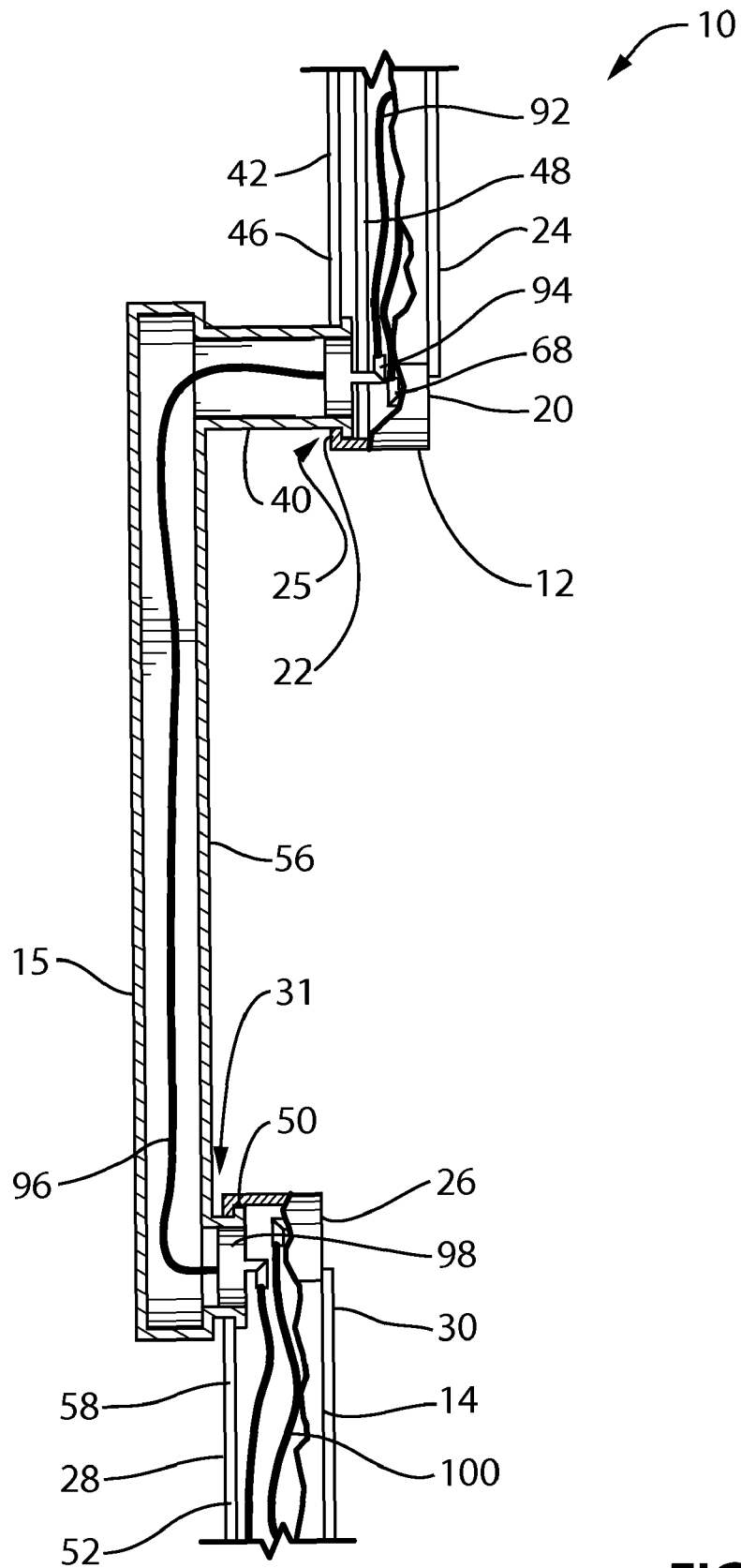
FIG. 6 is a magnified cutaway elevation view of a side edge of the handheld electronic device shown in FIG. 1, in the spaced-apart position.

The second slide connection 31 may be made up of a second mushroom pin 50 at a second end 51 of the bridge 15 and a second device member slot 52 (shown more clearly in FIG. 7) on the second face 28 of the second device member 14. Referring to FIG. 5, the second mushroom pin 50 has a flange 54 that may cooperate with the first face, shown at 56, of the bridge 15 to capture the wall shown at 58 on the second device member 14 in which the second device member slot 52 is defined. During movement of the second device member 14 between the first position (FIG. 5) and the second position (FIG. 6), the second device member 14 remains in sliding contact with the first face 56 of the bridge 15. Alternatively, the second device member 14 may contain a second wall (not shown) similar to the second wall 48 in the first device member 12, for capturing the flange 54 of the second mushroom pin 50.

Figure 7:
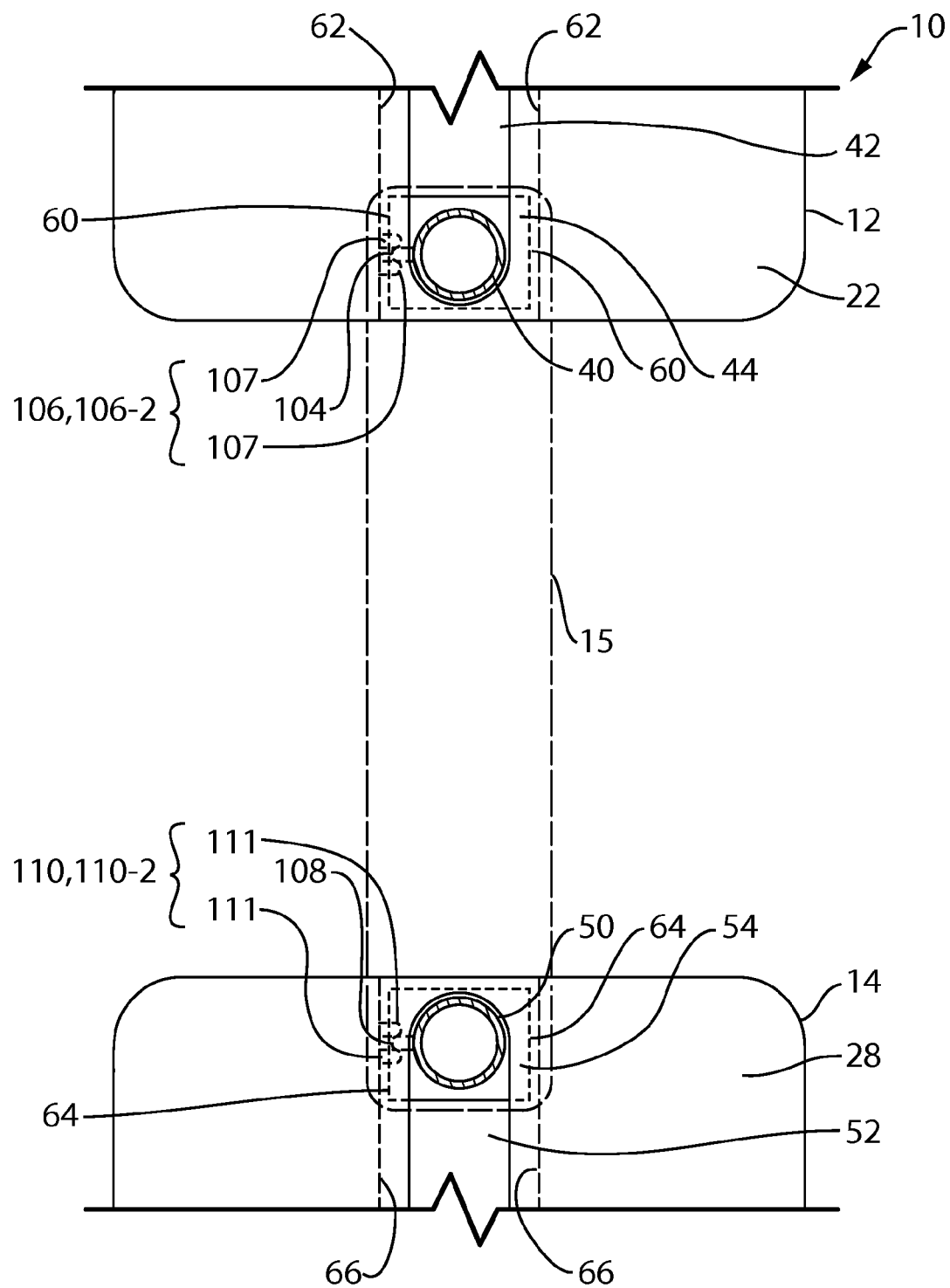
FIG. 7 is a magnified elevation view of a portion of the handheld electronic device shown in FIG. 1, in the spaced-apart position.

Referring to FIG. 7, the flange 44 on the first mushroom pin 40 may have generally straight side edges, shown at 60, which engage first flange guide walls shown at 62 in the first device member slot 42. The first flange guide walls 62 cooperate with the side edges 60 of the flange 44 to permit sliding movement of the first mushroom pin 40 in the first device member slot 42 while preventing relative rotation between the first mushroom pin 40 and the first device member 12. As a result, the first device member 12 may be slidable relative to the bridge 15, but may have a fixed orientation (i.e. it may be fixed rotationally) relative to the bridge 15. The bridge 15 is shown in phantom outline in FIG. 7 to assist in illustrating the relationships between the first and second device members 12 and 14 and the bridge 15 without obscuring selected components.

Similarly to the flange 44 on the first mushroom pin 40, the flange 54 on the second mushroom pin 50 may have generally straight side edges, shown at 64, which engage second flange guide walls shown at 66 in the second device member slot 52. The second flange guide walls 66 cooperate with the side edges 64 of the flange 54 to permit sliding movement of the second mushroom pin 50 in the second device member slot 52 while preventing relative rotation between the second mushroom pin 52 and the second device member 14. As a result, the second device member 14 may be slidable relative to the bridge 15, but may have a fixed orientation (i.e. it may be fixed rotationally) relative to the bridge 15.

Figure 8:
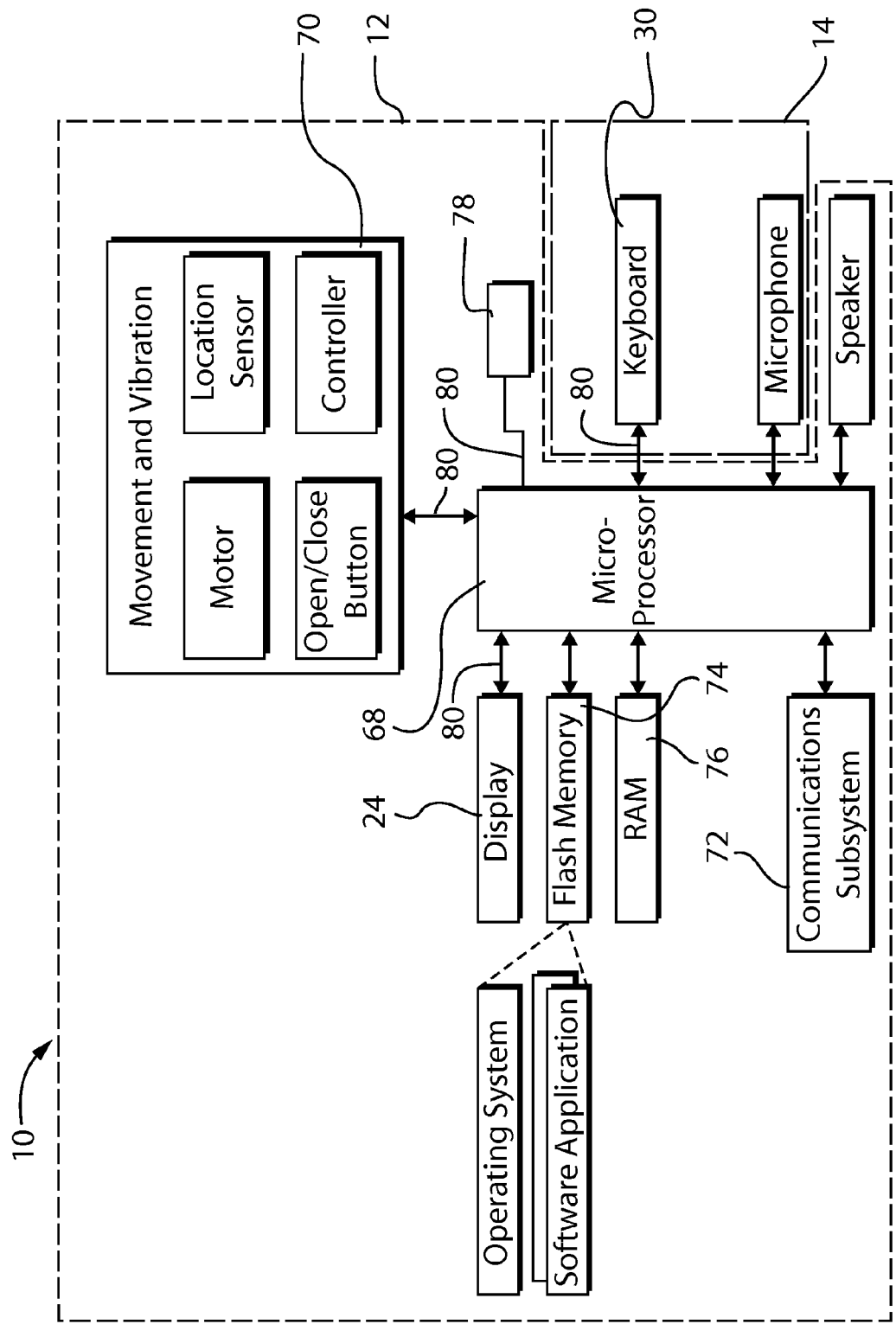
FIG. 8 is a schematic view of selected components that are part of the handheld electronic device shown in FIG. 1.

Reference is made to FIG. 8, which shows exemplary inner components of the handheld electronic device 10. In embodiments wherein the handheld electronic device 10 is a smartphone, it may include a main processor 68 which communicates with the first and second i/o elements 24 and 30, and also with other i/o elements that may be incorporated into the handheld electronic device 10, such as, for example, a speaker and a microphone. The main processor 68 may also communicate with a plurality of other components, such as a movement and vibration subsystem 70, a communications subsystem 72, flash memory 74 for holding software applications and data, and RAM 76. The main processor 68 receives power from a battery 78 and may distribute power from the battery 78 to other components such as the first and second i/o elements 24 and 30. Aside from the positioning of the first i/o element 24 in the first device member 12 and the positioning of the second i/o member 30 in the second device member 14, the main processor 68 and all the aforementioned components may be housed in any suitable component of the handheld electronic device. For example, the main processor 68 and all the aforementioned components except for the second i/o element 30 and the microphone (if provided) may be housed in the first device member 12, and the second i/o element 30 and the microphone (if provided) may be housed in the second device member 14. Alternatively, some of the aforementioned components may be housed in the bridge 15 (not shown in FIG. 8).

A plurality of electrical connectors 80 may connect selected components of the handheld electrical device 10 together, such as, for example, the main processor 68 and the second i/o element 30. Referring to FIG. 5, to permit the routing of electrical connectors 80 throughout the handheld electrical device 10 as desired, selected components of the device 10 may be hollow. For example, the first mushroom pin 40 may be hollow and may have a first mushroom pin conduit passage 82 therethrough that communicates at one end with the interior, shown at 84, of the first device member 12. The first mushroom pin conduit passage 82 communicates at another end with a bridge conduit passage 86 that extends through the bridge 15. The bridge conduit passage 86 further communicates with a second mushroom pin conduit passage 88 in the second mushroom pin 50, which in turn communicates with the interior, shown at 90, of the second device member 14.

The plurality of electrical conduits 80 may have any suitable make up. For example, the electrical conduits 80 may include a plurality of first device member electrical conduits 92, which may be in the form of a first device member ribbon cable in the interior 84 of the first device member 12, a first junction block 94 in the first mushroom pin 40, a plurality of bridge electrical conduits 96, which may be in the form of a ribbon cable in the bridge conduit passage 86, a second junction block 98 in the second mushroom pin 50 and a plurality of second device member electrical conduits 100, which may be in the form of a second device member ribbon cable in the interior 90 of the second device member 14. The first device member electrical conduits 92 may extend between the main processor 68 and the first junction block 94. In embodiments wherein the one or more first device member electrical conduits 92 are in the form of a ribbon cable, the ribbon cable may be configured to be sufficiently flexible to permit flexure during relative movement between the first device member 12 and the first junction block 94 but sufficiently rigid to inhibit bunching during such movement. The first junction block 94 connects the first device member electrical conduits 92 to the bridge electrical conduits 96. The bridge 15 is shown as having a bridge conduit passage 86 for holding the bridge electrical conduits 96, however, it is alternatively possible for the bridge 15 to lack a bridge conduit passage and for the bridge electrical conduits 96 to instead be molded directly into the body of the bridge 15. The second device member electrical conduits 100 may extend between the second i/o element 30 and/or any other suitable component in the second device member 14, and the second junction block 98 and is configured to be sufficiently flexible to permit flexure during relative movement between the second device member 14 and the second junction block 98 but sufficiently rigid to inhibit bunching during such movement. While a plurality of electrical conduits are described as being provided in the first device member 12, the bridge 15 and the second device member 14, it is alternatively possible for there to be as few as one electrical conduit 92 in the first device member, one bridge electrical conduit 96 and one second device member electrical conduit 100.

Figure 9:
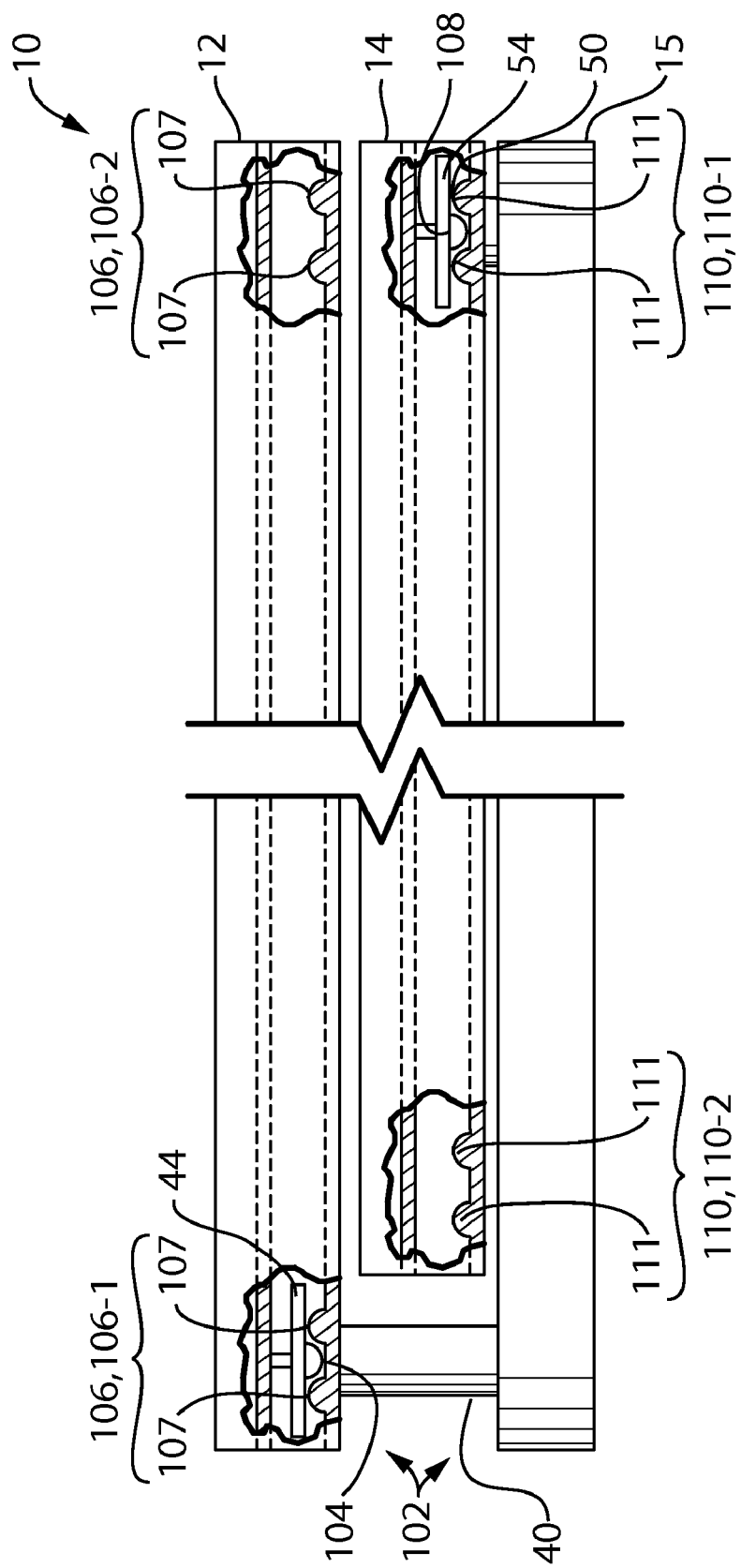
FIG. 9 is another magnified cutaway elevation view of a side edge of the handheld electronic device shown in FIG. 1, in the closed position.

Referring to FIG. 9, a slide detent arrangement 102 may be provided to hold the handheld electronic device 10 in the closed position (FIG. 9) and in the spaced-apart position (shown in FIG. 7). The slide detent arrangement 102 may include a first mushroom pin projection 104 that is receivable in a plurality of first device member slide detents 106 on the first device member 12, and a second mushroom pin projection 108 on the second mushroom pin 50 that is receivable in a plurality of second slide detents 110 on the second device member 14. Each first device member slide detent 106 may be made up of two projections 107 that are proximate one another. The first device member slide detents 106 may include a first position slide detent 106-1 corresponding to the first position of the first device member 12 and a second position slide detent 106-2 corresponding to the second position of the first device member 12. The first device member 12 is shown in the first position in FIG. 9 and in the second position in FIG. 7. The second slide detents 110 may be similar in structure to the first device member slide detents 106 and may include two projections 111 that are proximate each other, and may include a first position slide detent 110-1 corresponding to the first position of the second device member 14 (FIG. 9) and a second position slide detent 110-2 corresponding to the second position of the second device member 14. The second device member 14 is shown in the first position in FIG. 9 and in the second position in FIG. 7.

Figure 10:
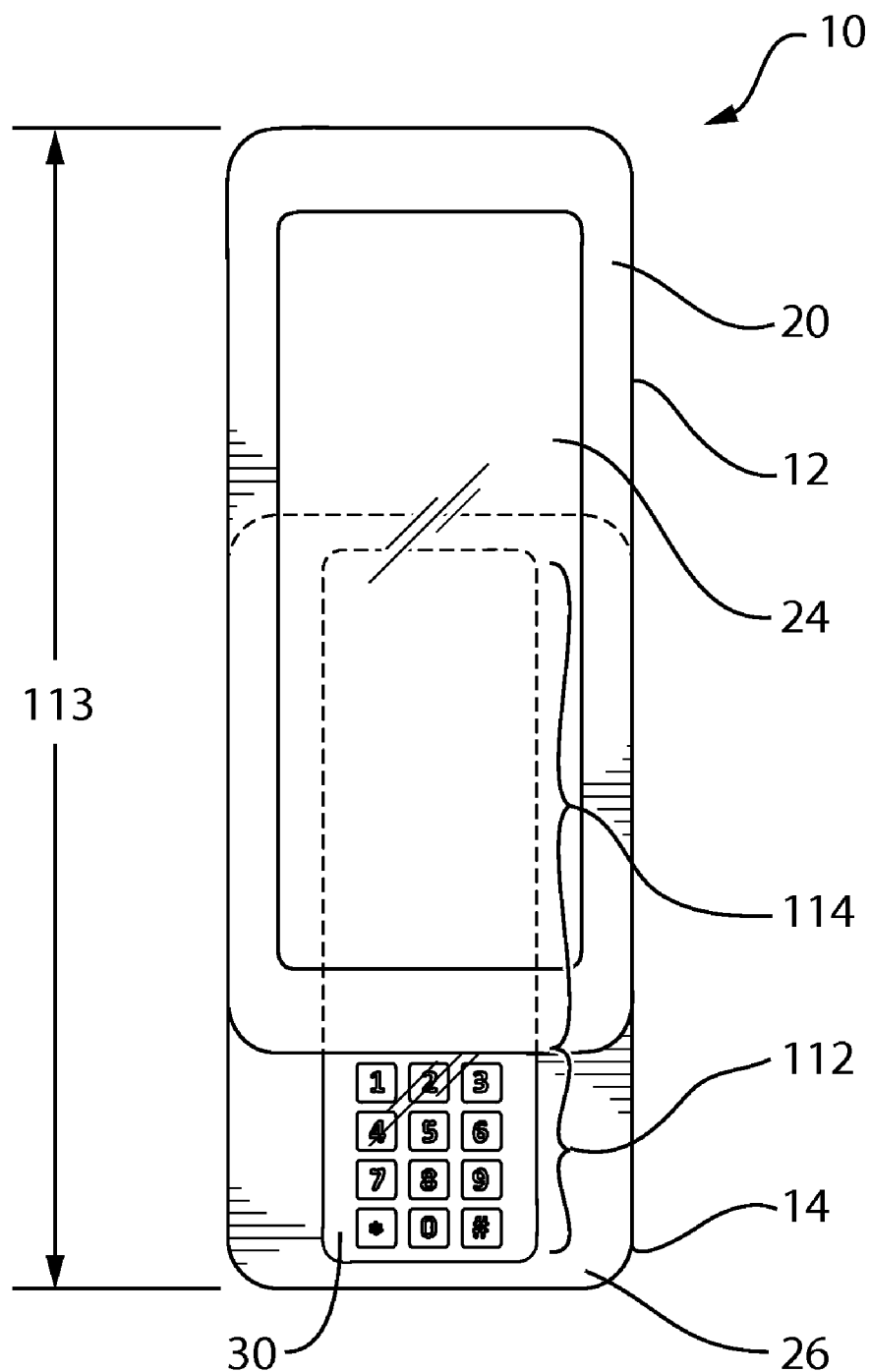
FIG. 10 is an elevation view of a side of the handheld electronic device shown in FIG. 1, in a first intermediate position.

In addition to the closed and spaced-apart positions, the first and second device members 12 and 14 may be positionable to provide the handheld electronic device 10 with one or more intermediate positions between the closed and spaced-apart positions. For example, a third position slide detent (not shown) may optionally be provided on the first device member 12 permitting the first device member 12 to move to and be held in a third position between the first and second positions. When the first device member 12 is in the third position and the second device member 12 is in the first position, as shown in FIG. 10, the handheld electronic device 10 is in a first intermediate position between the spaced-apart and closed positions. When the handheld electronic device 10 is in the first intermediate position the first device member 12 permits access to a first portion, shown at 112, of the second i/o element 30 that was blocked when the device 10 was in the closed position (FIG. 2-1). The first portion 112 of the second i/o element 30 may include, for example, a telephone keypad, thereby permitting a user to make a telephone call from the handheld device 10. In the first intermediate position, the handheld device 10 may have a length 113 that is suited for use as a cellular telephone.

In the first intermediate position shown in FIG. 10, the first device member 12 blocks access to a second portion, shown at 114, of the second i/o element 30. The second portion 114 of the second i/o element 30 may include, for example, an alphabetic keypad.

The first and second device members 12 and 14 may be positionable in positions corresponding to a second intermediate position for the handheld electronic device 10, as shown in FIGS. 11-1 and 11-2. In the second intermediate position, the first device member 12 and second device member 14 are proximate each other, but the first device member 12 does not block access to any of the second i/o element 30 (i.e. the first device member 12 permits access to the entirety of the second i/o element 30). In the second intermediate position, one of the edges, shown at 116, of the first device member 12 may be generally aligned with an opposing edge, shown at 118 on the second device member 14. For example, in the configuration shown in FIGS. 11-1 and 11-2, the lower edge 116 of the first device member 12 is generally aligned with the upper edge 118 of the second device member 14. In an embodiment wherein the first device member 12 is the lower device member and the second device member is an upper device member, the edge 116 on the first device member 12 may be an upper edge and the edge on the second device member 14 may be a lower edge.

Figure 12:
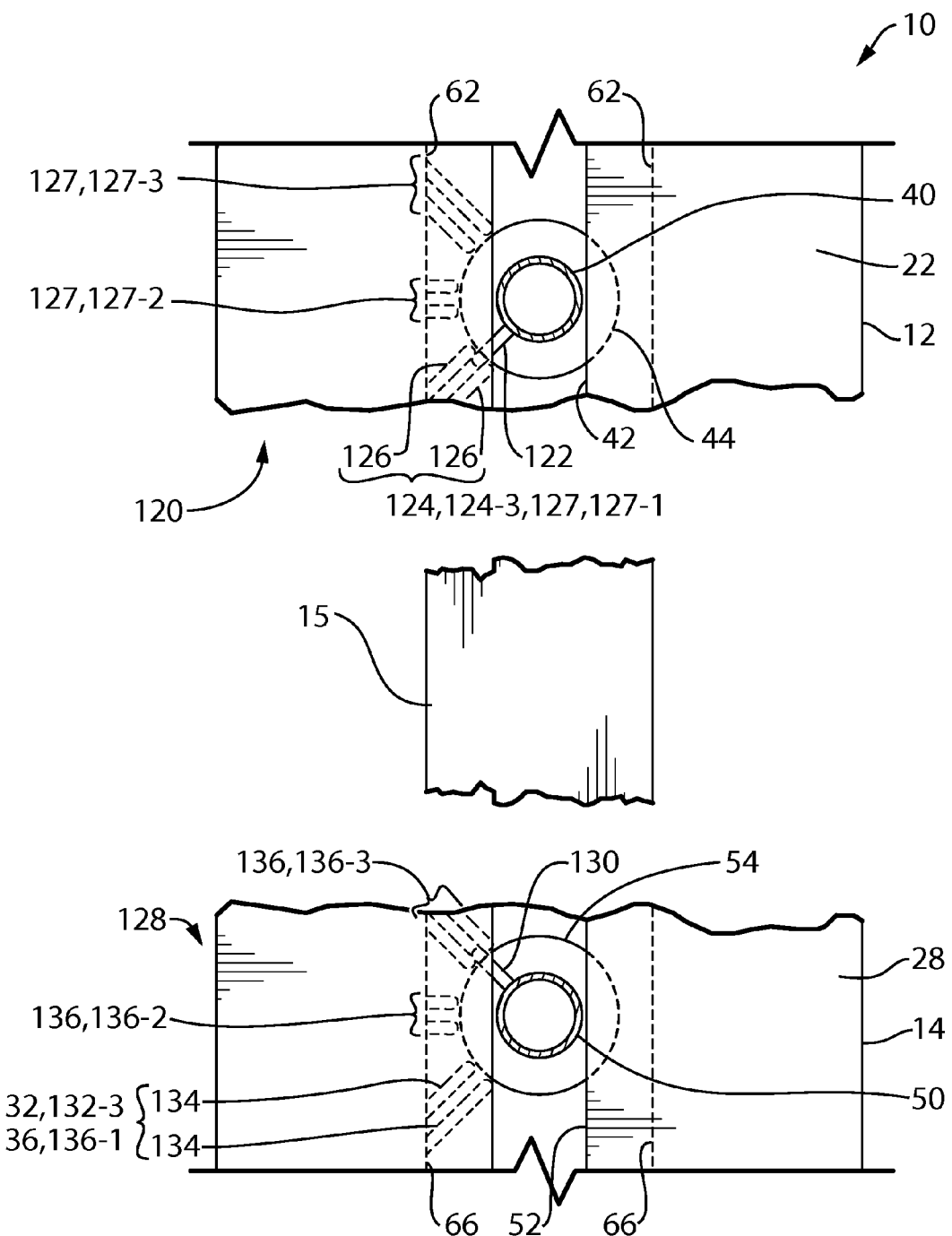
FIG. 12 is a magnified elevation view of a portion of the handheld electronic device shown in FIG. 1, showing an optional structure to permit rotation of first and second device members of the handheld electronic device.

Reference is made to FIG. 12. It is optionally possible for the first device member 12 or the second device member 14 or both to be individually rotatable in addition to being slidable relative to the bridge 15. To provide rotatability to the first device member 12, the flange 44 on the first mushroom pin 40 may be made circular, instead of being rectangular as shown in FIG. 7. A first combination detent arrangement 120 may be provided to permit the first device member 12 to be held at a plurality of selected positions relative to the bridge 15 and to be held in a plurality of orientations relative to the bridge 15 while at one or more of the selected positions. For example, in the embodiment shown in FIGS. 13-1, 13-2 and 13-3, the first device member 12 is holdable in one orientation while at a first (closed) position and at a second (spaced-apart) position, and is holdable in three different orientations while at a third position. As is described in further detail below, in the embodiment shown in FIGS. 13-1, 13-2 and 13-3, the third position of the first device member 12 may be a position that permits the first device member 12 to rotate from a portrait orientation to a landscape orientation (see FIG. 13-3), while keeping the first i/o element 24 centered relative to the second i/o element 30.

The first combination detent arrangement 120 may include a first mushroom pin projection 122 that is receivable in a plurality of first device member slide detents 124 (FIG. 13-1) on the first device member 12, including a first position slide detent 124-1 corresponding to the first position of the first device member 12, a second position slide detent 124-2 corresponding to the second position of the first device member 12 and a third position slide detent 124-3 corresponding to a third position of the first device member 12.

Referring to FIG. 12, each first device member slide detent 124 may be made up of two projections 126 that are proximate one another. The first mushroom pin projection 122 is also receivable in a plurality of first device member rotation detents 127 on the first device member 12 for holding the first device member 12 in a plurality of orientations when in the second position. The first device member rotation detents 127 include a first rotation detent 127-1 corresponding to a first orientation of the first device member 12 (FIG. 13-1), a second rotation detent 127-2 corresponding to the second orientation of the first device member 12 (FIG. 13-2) and a third rotation detent 127-3 corresponding to the third orientation of the first device member 12 (FIG. 13-3). It will be the noted that the third position slide detent 124-3 is also the first rotation detent 127-1.

Referring to FIG. 13-1, the first orientation of the first device member 12 may be a portrait orientation, which means that when held as appropriate for viewing of the contents displayed on the first i/o element 24, the first device member 12 has a height 129-1 that is larger than its width, shown at 125-1. A portrait orientation for the first device member 12 may be suited for several purposes, such as, for example, certain types of video games, or for viewing lists of address book contacts.

In the second orientation the first device member 12 (FIG. 13-2) may be canted at a selected angle, such as 45 degrees, from the first orientation. The third orientation (FIG. 13-3) may be a landscape orientation, which means that when held as appropriate for viewing of the contents displayed on the first i/o element 24, the first device member 12 has a width 125-1 that is larger than its height 129-1. A landscape orientation may be suited for several purposes such as, for example, for certain types of video game, or for entering textual information such as emails.

Referring to FIG. 12, a second combination detent arrangement 128 may be provided to permit the second device member 14 to be held at a plurality of selected positions relative to the bridge 15 and to be held in a plurality of orientations relative to the bridge 15 while at one or more of the selected positions. For example, the second combination detent arrangement 128 may permit the second device member 14 to be held in either of the two positions shown in FIGS. 2-1 and 3-1, and to be held in any of three orientations shown in FIGS. 14-1, 14-2 and 14-3 when in one or more of the selected positions.

Figures 1, 14:
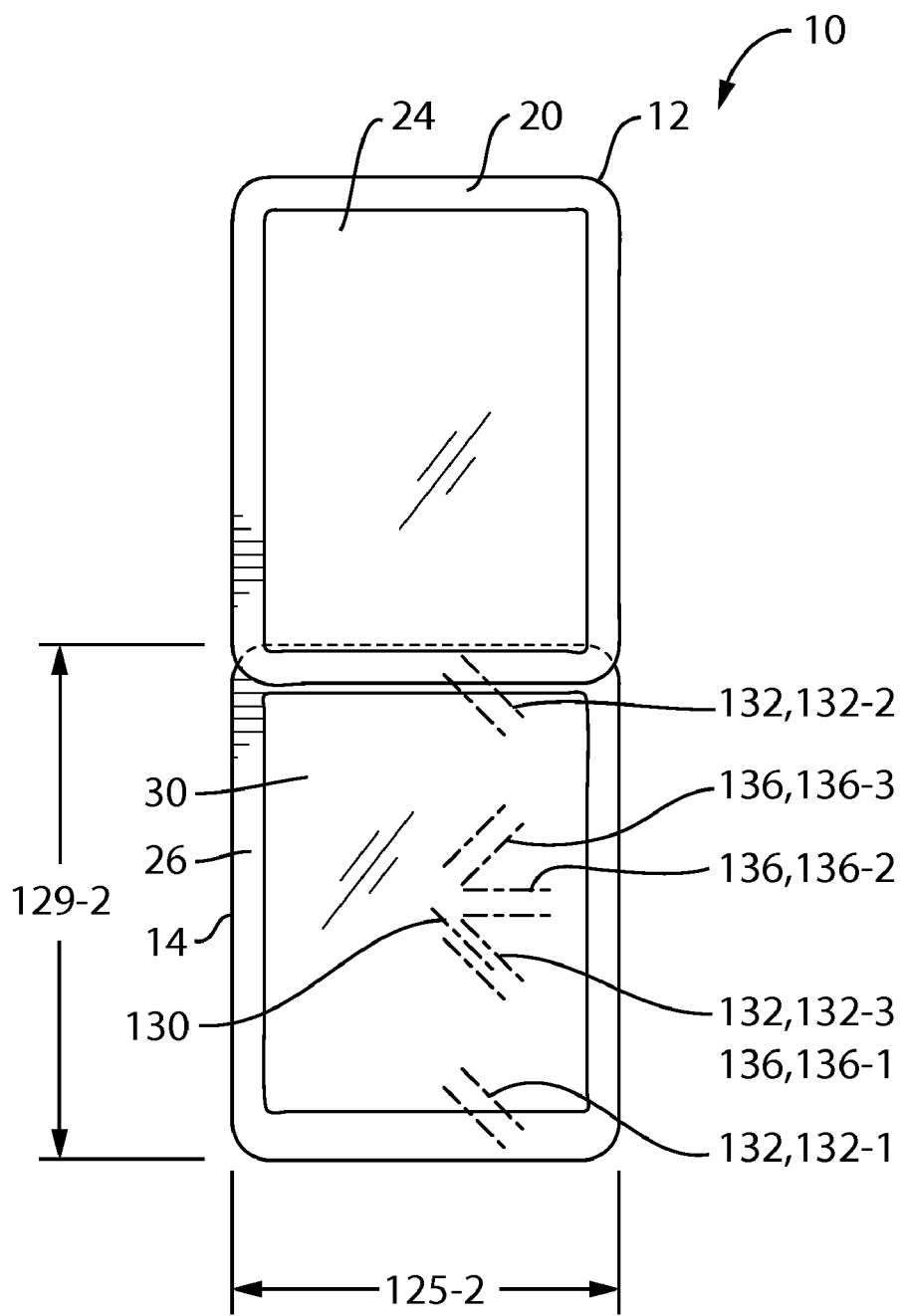
Figures 2, 14:
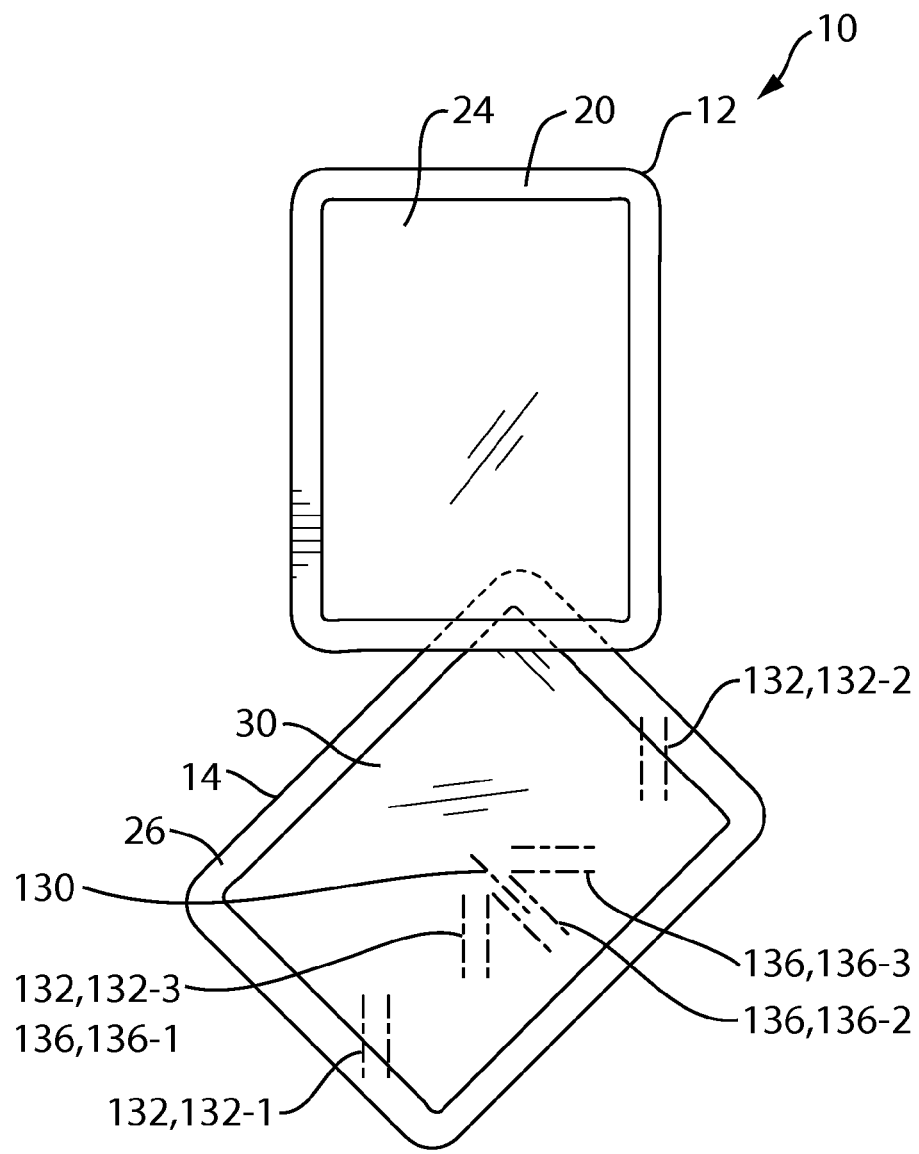
Figures 3, 14:
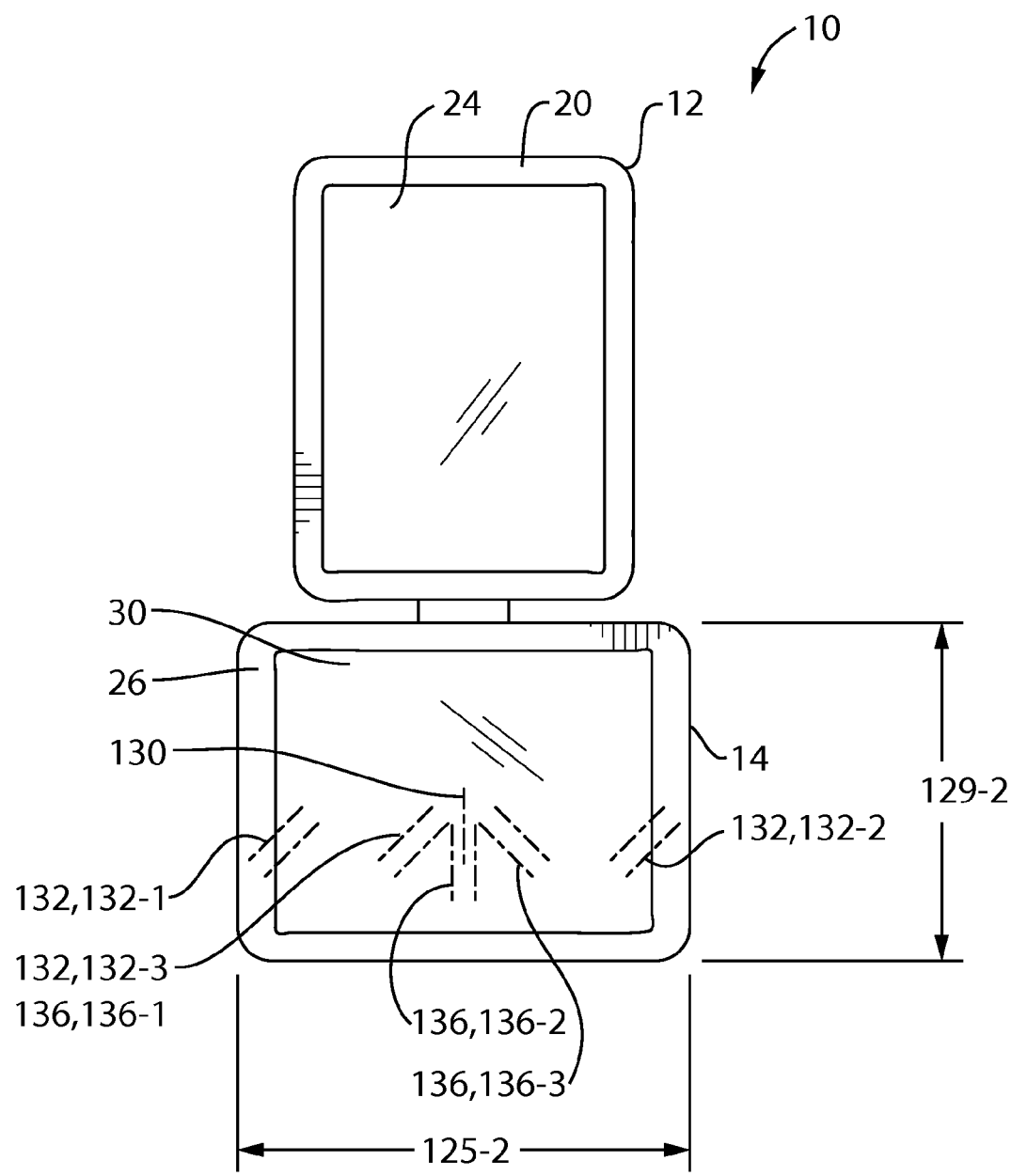

The second combination detent arrangement 128 may include a second mushroom pin projection 130 that is receivable in a plurality of second device member slide detents 132 (FIG. 14-1) on the second device member 14, including a first position slide detent 132-1 corresponding to the first position of the second device member 14 and a second position slide detent 132-2 corresponding to the second position of the second device member. Each second device member slide detent 132 may be made up of two projections 134 that are proximate one another. The second mushroom pin projection 130 is also receivable in a plurality of second device member rotation detents 136 on the device member device member 14 for holding the device member device member 14 in a plurality of orientations when in the second position. The second device member rotation detents 136 include a first rotation detent 136-1 corresponding to a first orientation of the second device member 14 (FIG. 14-1), a second rotation detent 136-2 corresponding to the second orientation of the second device member 14 (FIG. 14-2) and a third rotation detent 136-3 corresponding to the third orientation of the second device member 14 (FIG. 14-3). It will be the noted that the third position slide detent 132c is also the first rotation detent 136-1.

The first orientation of the second device member 14 (FIG. 14-1) may be a portrait orientation, which means that when held as appropriate for inputting of information using the second i/o element 30, the second device member 14 has a height 129-2 that is larger than its width, shown at 125-2. A portrait orientation for the second device member 14 may be suited for several purposes, such as, for example, for holding the handheld electronic device 10 while viewing information displayed on the first i/o element 24 on the first device member 12.

In the second orientation the second device member 14 (FIG. 14-2) may be canted at a selected angle, such as 45 degrees, from the first orientation. The third orientation may be a landscape orientation (FIG. 14-3), which means that when held as appropriate for inputting of information using the second i/o element 30, the second device member 14 has a width 125-2 that is larger than its height 129-2. When in the landscape orientation as shown in FIG. 14-3, an alphabetic keypad that may be included in the second i/o element 30 may be oriented for use by a user while being positioned below the first device member 12. In the position shown in FIG. 14-3, the second device member 14 may be suited for several purposes, such as, for example, entering textural information using the second i/o element 30.

The first and second combination detent arrangements 120 and 128 may together make up an overall combination detent arrangement 138 (FIGS. 15-1, 15-2 and 15-3).

Figures 1, 15:
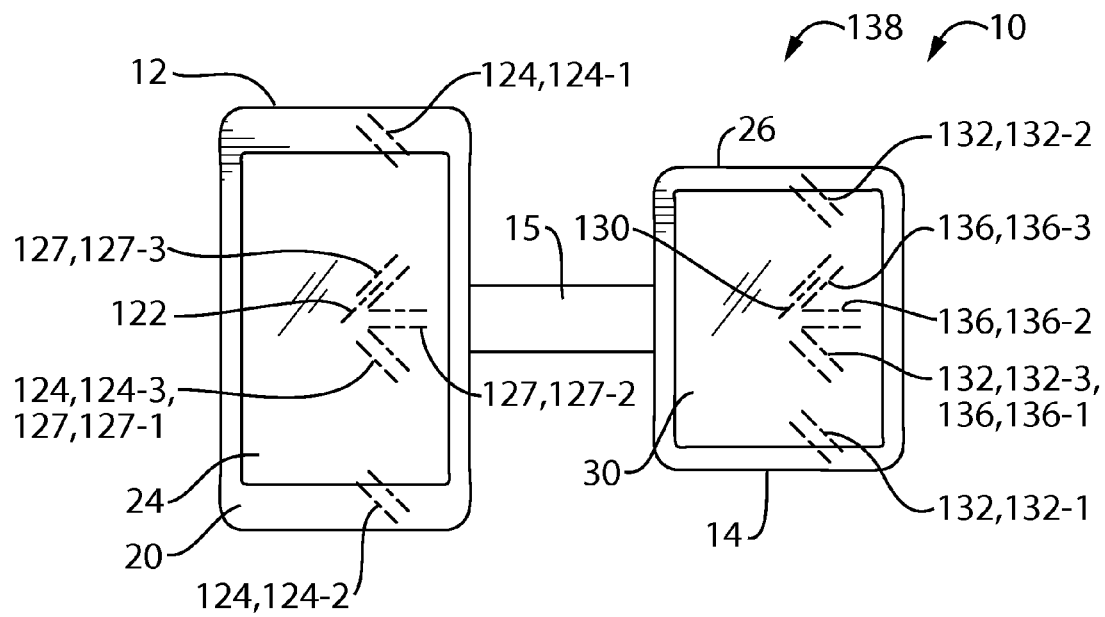
Figures 2, 15:
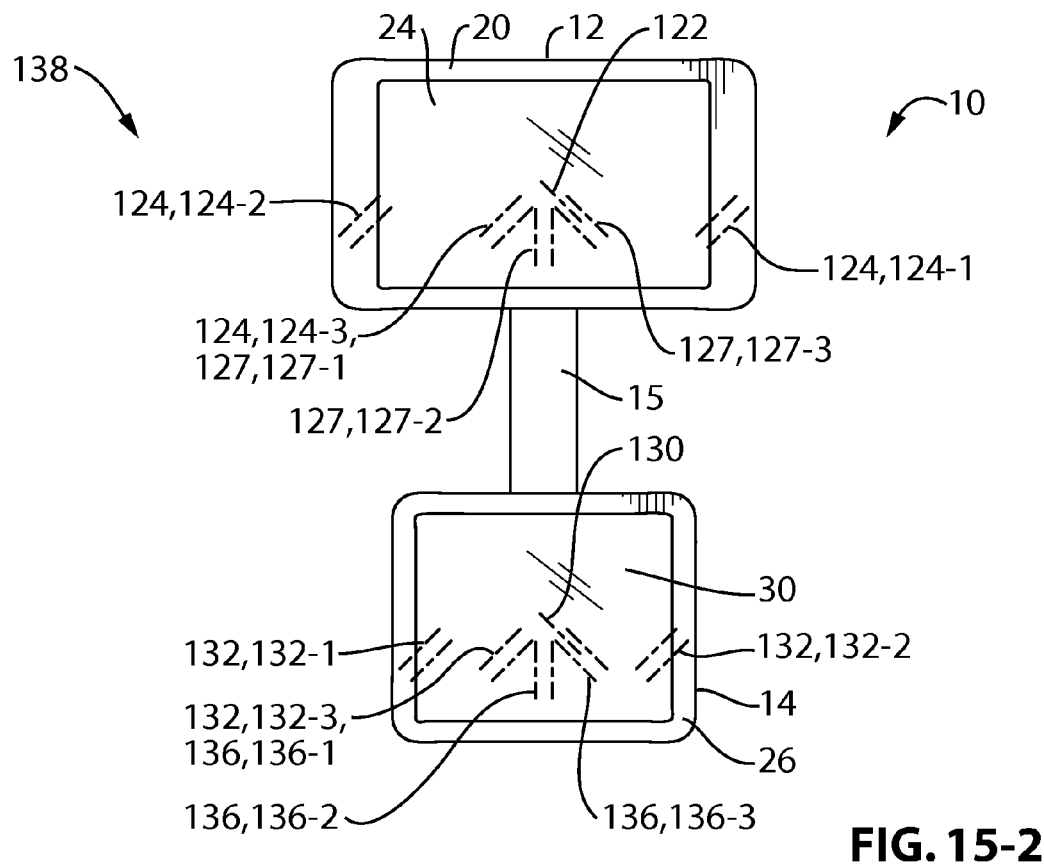
Figures 3, 15:
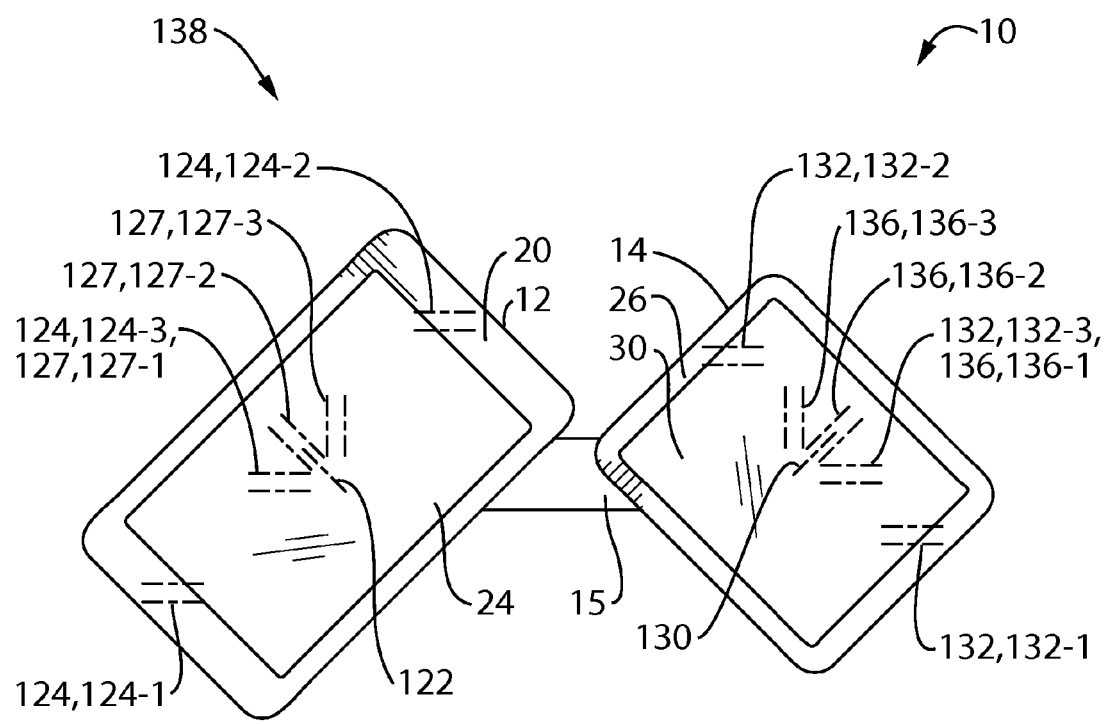

By permitting the first and second device members 12 and 14 to rotate independently of one another, several configurations may be made that have specific advantages for carrying out selected functions. Referring to FIG. 15-1, the first and second device members 12 and 14 and the bridge 15 may be oriented so that the first device member 12 is in a portrait orientation, and the second device member 14 is horizontally spaced from the first device member 12 and is in a portrait orientation. Referring to FIG. 15-2, the first and second device members 12 and 14 and the bridge 15 may be oriented so that the first device member 12 is in a landscape orientation, and the second device member 14 is vertically spaced from the first device member 12 and is in a landscape orientation. FIG. 15-3 shows the handheld electronic device 10 with a different arrangement of detents 124 and 127 on the first device member 12 than the arrangement shown in FIG. 12. In the embodiment shown in FIG. 15-3, the first and second device members 12 and 14 and the bridge 15 may be oriented so that the first device member 12 is in a selected canted orientation, and the second device member 14 is horizontally spaced from the first device member 12 and is in a selected canted orientation. For example, with first i/o element 24 being a touchscreen and second i/o element 30 being a keypad, this configuration may offer ergonomic use as a game controller. Other exemplary arrangements of detents and other positions and orientations for the first and second device members 12 and 14 and the bridge 15 are possible.

It will be understood that it is optionally possible for one or both of the first and second device members 12 and 14 to have a height that is approximately equal to its width (e.g. it may be generally square). In such an embodiment the said device member would not have a portrait orientation or a landscape orientation associated therewith.

Figures 2, 16:
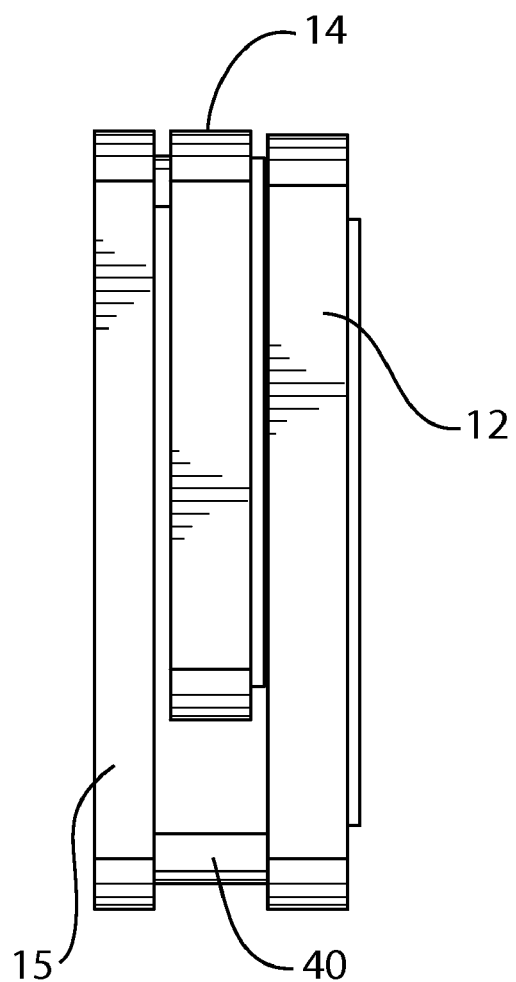
Figures 1, 16:
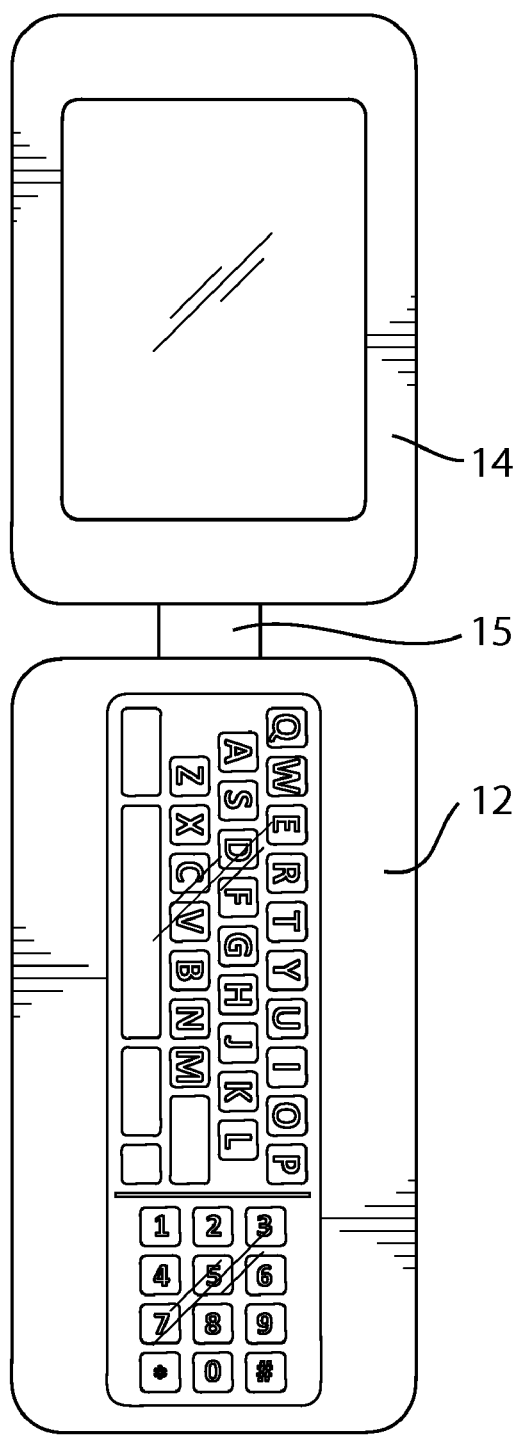

Reference is made to FIGS. 16-1 and 16-2 which show the handheld electronic device 10 with the first device member 12 being the lower device member and with the second device member being the upper device member. In the embodiment shown in FIGS. 16-1 and 16-2, the first i/o element 24 on the first device member 12 may be for example an alphabetic keypad with a telephone keypad, and the second i/o element 30 on the second device member 14 may be, for example, a display. The first i/o element 24 may be rotatable to a landscape orientation for entering text. The second i/o element 30 may be rotatable to a landscape orientation.

In FIGS. 13-1, 13-2, 13-3, 16-1 and 16-2, only the centerlines of the bosses that make up the detent arrangements are shown, for ease of illustration.

In the embodiments shown and described, the detent arrangements have included projections 122 and 130 on the first and second mushroom pins 40 and 50, detents 124 and 127 on the first device member and detents 132 and 136 on the second device member 14. It is alternatively possible for the projections 122 and 130 on the first and second mushroom pins 40 and 50 to be replaced with detents and for the detents 124, 127, 132 and 136 to be replaced with projections.

The handheld electronic device 10 has been shown to have a first i/o element 24 on the first device member 12 and a second i/o element on the second i/o element 14. It is optionally possible for the device 10 to have a third i/o element 140 (see FIG. 3-1), which may, for example, be a camera on the second face 22 of the first device member 12. Other i/o elements (not shown) may be provided on the first and second device members 12 and 14 as desired.

While the above description constitutes a plurality of embodiments of the present technology, it will be appreciated that embodiments with other modifications would remain within the fair meaning of the accompanying claims.

What is claimed is:

1. A handheld electronic device, comprising:
   a bridge;
   a first device member having a first i/o element thereon, wherein the first device member is slidably connected to the bridge for movement along a first device member path; and
   a second device member having a second i/o element thereon, wherein the second device member is slidably connected to the bridge for movement along a second device member path,
   wherein the first and second device members are slidable relative to the bridge between a closed position for the handheld electronic device and a spaced-apart position for the handheld electronic device, wherein in the closed position the first and second device members overlap such that the first device member blocks access to the second i/o element, and wherein in the spaced-apart position the second i/o element is entirely accessible and the first and second device members are spaced apart by a selected non-zero spacing in a direction that is parallel to the first and second device member paths,
   wherein in the closed position the second member is between the first member and the bridge.

2. A handheld electronic device as claimed in claim 1, wherein the first i/o element is a display and the second i/o element is an input element.

3. A handheld electronic device as claimed in claim 2, wherein the second i/o element includes a keypad.

4. A handheld electronic device as claimed in claim 2, wherein the first and second device members are slidable to an intermediate position for the handheld electronic device that is between the spaced-apart position and the closed position, wherein in the intermediate position the first device member permits access to a first portion of the second i/o element and blocks access to a second portion of the second i/o element.

5. A handheld electronic device as claimed in claim 4, wherein the first portion of the second i/o element includes a telephone keypad.

6. A handheld electronic device as claimed in claim 4, wherein the intermediate position is a first intermediate position, and wherein the first and second device members are further slidable to a second intermediate position for the handheld electronic device that is between the spaced-apart position and the closed position, wherein in the second intermediate position the first device member permits access to all of the second i/o element and wherein the first and second device members are proximate to one another.

7. A handheld electronic device as claimed in claim 1, wherein the first and second device members are slidable to an intermediate position for the handheld electronic device that is between the spaced-apart position and the closed position, wherein in the intermediate position the first device member permits access to all of the second i/o element and wherein the first and second device members are proximate to one another.

8. A handheld electronic device as claimed in claim 1, further comprising a detent arrangement configured for holding the first and second device members in the spaced-apart and closed positions.

9. A handheld electronic device as claimed in claim 8, wherein at least one of the first and second device members is rotatable between a first orientation and a second orientation relative to the bridge, and wherein the detent arrangement is configured for holding the at least one of the first and second device members in each of the first and second orientations.

10. A handheld electronic device as claimed in claim 1, wherein at least one of the first and second device members is rotatable between a first orientation and a second orientation relative to the bridge.

11. A handheld electronic device, comprising:
a bridge;
a first device member having a first i/o element thereon, wherein the first device member is slidably connected to the bridge for movement along a first device member path; and
a second device member having a second i/o element thereon, wherein the second device member is slidably connected to the bridge for movement along a second device member path,
wherein the first and second device members are slidable relative to the bridge between a closed position for the handheld electronic device and a spaced-apart position for the handheld electronic device,
wherein in the closed position the first and second device members overlap such that the first device member blocks access to the second i/o element,
wherein in the spaced-apart position the second i/o element is entirely accessible and the first and second device members are spaced apart by a selected non-zero spacing in a direction that is parallel to the first and second device member paths, and
wherein the bridge has a first end with a first mushroom pin thereat and a second end with a second mushroom pin thereat, wherein the first device member has a first device member slot slidably connected to the first mushroom pin and wherein the second device member has a second device member slot slidably connected to the second mushroom pin.

12. A handheld electronic device as claimed in claim 11, wherein the first device member includes at least one first device member electrical conduit therein that connects between at least one first device member component in the first device member and at least one bridge electrical conduit in the bridge through the first mushroom pin, and wherein the second device member includes at least one second device member electrical conduit therein that connects between at least one second device member component in the second device member and the at least one bridge electrical conduit in the bridge through the second mushroom pin.

13. A handheld electronic device as claimed in claim 11, further comprising a first mushroom pin projection on the first mushroom pin, a plurality of first device member detents on the first device member, a second mushroom pin projection on the second mushroom pin and a plurality of second device member detents on the second device member, wherein the first and second device member detents are positioned for holding the first and second device members in the spaced-apart and closed positions for the handheld electronic device.

14. A handheld electronic device as claimed in claim 13, wherein the first and second device member detents are positioned for holding the first and second device members in at least one intermediate position between the spaced-apart and closed positions for the handheld electronic device.

15. A handheld electronic device as claimed in claim 13, wherein the first device member detents are first device member position detents and the second device member detents are second device member position detents, wherein the handheld electronic device further comprises a plurality of first device member rotation detents positioned for holding the first device member in a plurality of orientations for the first device member and wherein the handheld electronic device further comprises a plurality of second device member rotation detents positioned for holding the second device member in a plurality of orientations for the second device member.

16. A handheld electronic device as claimed in claim 13, wherein the first i/o element is a display and wherein the first i/o element is viewable in both the closed and spaced-apart positions for the handheld electronic device.

17. A handheld electronic device, comprising:
a bridge;
a first device member having a first i/o element thereon, wherein the first device member is slidably connected to the bridge for movement along a first device member path; and
a second device member having a second i/o element thereon, wherein the second device member is slidably connected to the bridge for movement along a second device member path,
wherein the first and second device members are slidable relative to the bridge between a closed position for the handheld electronic device and a spaced-apart position for the handheld electronic device,
wherein in the closed position the first and second device members overlap such that the first device member blocks access to the second i/o element,
wherein in the spaced-apart position the second i/o element is entirely accessible and the first and second device members are spaced apart by a selected non-zero spacing in a direction that is parallel to the first and second device member paths, and wherein the first device member includes at least one first device member electrical conduit therein that connects between at least one first device member component in the first device member and at least one bridge electrical conduit in the bridge, and wherein the second device member includes at least one second device member electrical conduit therein that connects between at least one second device member component in the second device member and the at least one bridge electrical conduit in the bridge.

18. A handheld electronic device, comprising:

a bridge;

a first device member having a first i/o element thereon, wherein the first device member is slidably connected to the bridge for movement along a first device member path; and a second device member having a second i/o element thereon, wherein the second device member is slidably connected to the bridge for movement along a second device member path, wherein the first and second device members are slidable relative to the bridge between a closed position for the handheld electronic device and a spaced-apart position for the handheld electronic device, wherein in the closed position the first and second device members overlap such that the first device member blocks access to the second i/o element, wherein in the spaced-apart position the second i/o element is entirely accessible and the first and second device members are spaced apart by a selected non-zero spacing in a direction that is parallel to the first and second device member paths, and wherein at least one of the first and second device members is rotatable between a first orientation and a second orientation relative to the bridge.

19. A handheld electronic device, comprising:

a bridge;

a first device member having a first i/o element thereon, wherein the first device member is slidably connected to the bridge for movement along a first device member path; and a second device member having a second i/o element thereon, wherein the second device member is slidably connected to the bridge for movement along a second device member path, wherein the first and second device members are slidable relative to the bridge between a closed position for the handheld electronic device and a spaced-apart position for the handheld electronic device, wherein in the closed position the first and second device members overlap such that the first device member blocks access to the second i/o element, wherein in the spaced-apart position the second i/o element is entirely accessible and the first and second device members are spaced apart by a selected non-zero spacing in a direction that is parallel to the first and second device member paths, and wherein at least one of the first and second device members is rotatable between a portrait orientation and a landscape orientation relative to the bridge.

20. A handheld electronic device, comprising:

a bridge;

a first device member having a first i/o element thereon, wherein the first device member is slidably connected to the bridge for movement along a first device member path; and a second device member having a second i/o element thereon, wherein the second device member is slidably connected to the bridge for movement along a second device member path, wherein the first and second device members are slidable relative to the bridge between a closed position for the handheld electronic device and a spaced-apart position for the handheld electronic device, wherein in the closed position the first and second device members overlap such that the first device member blocks access to the second i/o element, wherein in the spaced-apart position the second i/o element is entirely accessible and the first and second device members are spaced apart by a selected non-zero spacing in a direction that is parallel to the first and second device member paths, and wherein the first device member is rotatable between a first orientation and a second orientation for the first device member relative to the bridge and the second device member is rotatable between a first orientation and a second orientation for the second device member relative to the bridge.

* * * * *